(12) United States Patent
Strobel

(10) Patent No.: US 7,905,591 B2
(45) Date of Patent: Mar. 15, 2011

(54) MULTI-FUNCTION, FOLDING READING GLASSES

(76) Inventor: Larry Strobel, Brentwood, CA (US)

( * ) Notice: Subject to any disclaimer, the term of this patent is extended or adjusted under 35 U.S.C. 154(b) by 551 days.

(21) Appl. No.: 11/923,445

(22) Filed: Oct. 24, 2007

(65) Prior Publication Data

US 2009/0190088 A1    Jul. 30, 2009

Related U.S. Application Data

(60) Provisional application No. 60/854,116, filed on Oct. 25, 2006.

(51) Int. Cl.
*G02C 7/10* (2006.01)
(52) U.S. Cl. .......................... 351/63; 351/119
(58) Field of Classification Search .............. 351/63, 351/64, 119, 111, 41, 158, 124, 128, 157; 2/454
See application file for complete search history.

(56) References Cited

U.S. PATENT DOCUMENTS

| | | | | |
|---|---|---|---|---|
| 2,798,409 A | * | 7/1957 | Speers | 351/157 |
| 4,681,410 A | * | 7/1987 | Paulsen | 351/63 |
| 5,532,766 A | * | 7/1996 | Mateer et al. | 351/63 |

* cited by examiner

*Primary Examiner* — Hung X Dang
(74) *Attorney, Agent, or Firm* — Matlock Law Group, PC

(57) ABSTRACT

The overall apparatus assembly provides folding reading glasses, survival series wherein the glasses fold into a jewelry shape hung from a necklace. The overall apparatus assembly further provides a hinged nose portion that allows the eyeglass lenses to fold inward in a quick snap action about the hinged nose. The temples also fold inward and serve as the encase thus protecting the lenses rotating about a second quick action hinge. The spring loaded hinges will provide for cam action to lock the glasses in either an open or closed position. The closed position will further protect the eyeglass lenses and provide a decorative jewelry shaped integral encasement to store the eyeglass apparatus and protect the lenses.

19 Claims, 26 Drawing Sheets

MULTI-FUNCTION, FOLDING READING GLASSES

CROSS-REFERENCES TO RELATED APPLICATIONS

This application claims the benefit of U.S. Provisional Application Ser. No. 60/854,116, filed Oct. 25, 2006, the disclosure of which is incorporated herein by reference in its entirety.

BACKGROUND

The present invention relates generally to a methods and a devices for providing multi-function folding eyewear including folding reading glasses, and more particularly to a systems and methods for a multi-function collapsible reading glass eyewear.

Various methods and designs of folding eyewear have been developed. Many of the reading glass variations provide a separate storage compartment to prevent the reading glasses from becoming damaged while not in use. Often, the reading glasses do not involve an optometric prescription but instead provide simple magnification for the purposes of reading. As a result, reading glasses are frequently needed to be carried on the person but not worn for vision purposes at all times.

Often, reading glasses are folded up and stored in a pocket or eyeglass storage compartment. However, such a compartment is neither convenient nor easy to access quickly when a reader needs to view written material. As a result, reading glasses are frequently folded into a closed position small enough to be worn in a pants or shirt pocket but not stowed into the compartment for protection. Unfortunately, the reading glasses are subsequently scratched or otherwise damaged since there is little protection for the lenses. Also, the folding frames are often damaged, especially at the mechanical joints, such as a pivot point by the frequent contact made to both the lenses and folding frames. When worn in a pocket, the frames can be damaged from inadvertent collisions with environmental hazards such as office furniture, automobile doors, and walls.

One approach to these issues is a simple magnifying glass which that is attached to a substantially round holder at a hinge or single pivot point. The holder provides protection for the eye glass. Although not technically a pair of reading glasses, such a device can serve this purpose in a similar configuration to that of a watch or timepiece. Such a stored eye glass or timepiece is well known in the art as are magnifying glasses that pivot out from a holder at a single pivot point. The problem with inventions devices such as these that pivot out from its holder is that they do not provide a single frame when more than one lens is required, such as found in eye wear that are meant to be worn for the purpose of improving vision. As a result, single lens devices are extremely limited in their ability to meet the vision improvement objectives that are required in many optometric applications. Depending on the vision of a particular user, reading glasses with a pair of lenses is often required. Unfortunately, such substantially round pivot opening or hinged opening devices are not properly constructed to protect a pair of lenses affixed to eyewear frames.

However, a combination of eyeglasses and case comprising a frame holding a plurality of lenses is also well known in the art. In some applications, a case for substantially encapsulating a pair of lenses and frame allows a single pivot point to open the article for use as reading glasses. Further, the frames may be integrally coupled to a leaf spring to provide a partial ejection of the reading glasses upon removal from the case. The leaf spring may optionally be used as an ear piece as well. An attachment mechanism further allows the frames to be removed from the case so that a user can wear the glasses without the case attached to the eyewear through the use of a push button release mechanism. The combination may include slide or other mechanisms to facilitate the eyeglasses from being movably attached to the case. Finally, the attachment mechanism may be further coupled to a chain to wear around the neck or belt. Nonetheless, these devices are disadvantageous because they do not allow for rapid access from the case nor do they facilitate improved fit when worn. Further, when worn by the user, the eyewear is distinctly separate from the case, leading to misplaced cases and unprotected eyewear subsequent to the need to rapidly access the eyeglasses.

Another approach known in the art provides eyewear frames that, when not in use as eyeglasses, may be folded into a band for the wrist, arm or ankle. An optional reminder pad may be attached to the eyewear frames for the person using the frames to write short reminders. The reminder pad may be made of paper, washable plastic, or any other suitable writing surface material. A lens may optionally pivot out to allow a user to view something. However, the constant motion and contact with surfaces when worn on the wrist, arm or ankle exposes the lenses to significant potential damage as well as scratching of the lenses. Also, the constant movement of the lenses and band may lead to the lens becoming separated from the band.

In an alternate concept to the previous ones known in the art, a pivoting, foldable eyeglass apparatus is provided. Although similar in concept to the previously described eyeglasses folded into a band for the wrist, arm or ankle, the current design uses a pivot point fastening means to join a first frame and a second frame while the previous approach utilizes a band of flexible material, typically constructed of a pliable material encapsulating a wire of sufficient combinations of strength and flexibility. In the current configuration, the pivoted fastening means foldable eyeglasses further provides a first and second leaf with a protrusion for locking the first frame to the second frame. The second frame has a third leaf with a detent for engaging the protrusion of the first frame such that the first and second frames are rotatably mounted together by a fastening pin hinge means. However, neither the current approach nor the previous approach provides a storage case to protect the lenses of the eyewear. As a result, the lenses are subject to the abuse discussed above including damage of the frames and scratching of the lenses or even worse, destruction of the lenses and frames if crushed up against a wall or piece of furniture.

Another similar device that is a collapsible eyewear apparatus that includes at least one lens supported by a lens support member and a shield member providing a protective shield for an entirety of the lens against inadvertent contact with foreign objects. In some configurations, the collapsible apparatus further includes an earpiece confinement portion distal from the attachment portion and an earpiece member interacting with the confinement portion to accommodate a coplanar relationship with the aperture frame. However, aesthetics are very important in fashionable eyewear and such a bulky set of features as found in this approach may not be desirable to many users. Further, the current configurations may not facilitate rapid access to wearing the lenses in a manner in which the desired material to be viewed is available. As a result, the entire purpose for reading glasses would be thereby defeated. Further, such configurations may also be difficult for older users who may have limited fine motor skills and coordination resulting in a slow time to access the actual reading lenses needed to view the desired subject matter.

In other alternatives, various ways of providing folding eyeglasses have been proposed to make the eyeglasses more compact, easier to carry or easier to store. In one configuration, a nose pad member provides a mechanism to make eyeglasses collapsible but not in a similar way to the pivoted hinge pin fastener. The collapsible glasses frame in the nose pad member configuration have fronts which are spread when used and collapsible when not used, including a mechanism for setting a pad member into a predetermined position when the fronts are spread for use, and a mechanism for shifting the pad member when the fronts are folded up, thus enabling the glasses frame to be made more compact. However, when folded up, the glasses do not provide any protection for the lenses.

Therefore it is desirable to provide a multifunction eyepiece that folds into a small shape that is can be easily manipulated and/or stored, e.g., hung from a necklace or tucked into a pocket of a shirt or blouse.

BRIEF SUMMARY OF THE INVENTION

An apparatus according to various embodiments, includes glasses that fold into a small compact, ornamental shape that can be easily manipulated and/or stored, e.g. hung from a necklace or tucked in a pocket of a shirt or blouse. In certain aspects, the eyeglass pieces fold inward on a hinge located at the nose, and the temples fold inward and are shaped, once folded, similar to the eyepieces. The temples also serve as an encasement thus protecting the lenses. The necklace attach points let the folded glasses hang aesthetically and symmetrically in a usable open position that may be spring actuated for quick snap open or closed action. The eyepieces fold inward toward the user and are shaped the same to fold tightly together. The eyepieces are also straight on a vertical plane so that they fold tightly together. In certain aspects, the temples are constructed of two pieces and are also straight on a vertical plane and once folded inward toward the eyepieces, serve to encase and protect the eyepieces. Further, the outside exterior finish of the encasement when worn around the neck allows for the multi-function device to be opened and closed without removal from its worn position. In general, the apparatus is comprised of various separate pieces including, in one aspect, a left and right eye piece, a left and right temple, and a left and right ear piece. The eye pieces can be joined together by an inward folding snap action hinge. The eyepieces can be attached to the temples by outward folding hinges and the temples can be attached to the ear pieces by an upward folding snap action hinge through the use of detents. The hinges can also be spring loaded with cam action so as to lock the glasses in the open as well as closed position.

According to one aspect, the overall apparatus assembly provides folding reading glasses, wherein the glasses fold into a small, compact ornamental shape hung from a necklace. The overall apparatus assembly further provides a hinged nose portion that allows the eyeglass lenses to fold inward in a quick snap action about the hinged nose. The temples also fold inward and serve as the encase thus protecting the lenses rotating about a second quick action hinge. The spring loaded hinges will provide for cam action to lock the glasses in either an open or closed position. The closed position will further protect the eyeglass lenses and provide an encasement (e.g. a decorative jewelry shaped integrally formed encasement) to store the eyeglass apparatus and protect the lenses.

In one aspect a multi-function folding reading glasses apparatus comprises a hinged nose mechanism mechanically coupled to a first frame eyepiece via a first temple. The first frame eyepiece is further attached to a first eye lens wherein the first frame eyepiece surrounds the first eye lens forming a continuously shaped, substantially rectangular aperture in which the first eye lens is mounted therein, said first frame eyepiece mechanically coupled to a first temple utilizing an outward folding hinge. A second frame eyepiece is further mechanically coupled to the hinged nose mechanism via a second temple, said second frame eyepiece attached to a second eye lens wherein said second frame eyepiece surrounds the second eye lens forming a continuously shaped, substantially rectangular aperture in which the second eye lens is mounted therein. A first ear piece is next mechanically coupled to the first temple, said first ear piece attached to the first temple by a first upward folding snap action hinge and a first earpiece detent including a spring loaded first cam location. A second ear piece is mechanically coupled to the second temple, said second ear piece attached to the second temple by a second upward folding snap action hinge and a second earpiece detent including a spring loaded second cam location. Also, an integrally formed eyeglass encasement is provided wherein the encasement is formed via an inward fold of the hinged nose mechanism and the mechanically coupled first and second eyepieces, first and second temples, and first and second earpieces. The encasement thereby forms a jewelry appearance in its fully enclosed configuration and forms a necklace attach point to hang the encasement therefrom via a mechanically coupled necklace loop and fully enclosing the eyeglass lenses. The overall apparatus assembly also provides a first and second lockable cam action hinge spring action position, said temples shaped, once folded, appearing the same as the eyepieces. Lastly, the overall apparatus folding reading glasses assembly provides a spring actuated quick snap open position, and a spring actuated quick snap closed position to provide rapid access to the reading glass lenses to be worn by a user.

Another aspect includes a multi-function folding reading glasses encasement that comprises a spring loaded, snap action, hinged nose mechanism mechanically coupled to a first frame eyepiece and a first temple, said first frame eyepiece attached to a first eye lens wherein said first frame eyepiece surrounds the first eye lens forming a continuously shaped, substantially rectangular aperture in which the first eye lens is mounted therein. The first frame eyepiece is mechanically coupled to a first temple utilizing a spring loaded, snap action, outward folding hinge, a second frame eyepiece mechanically coupled to the hinged nose mechanism and a second temple. The second frame eyepiece is attached to a second eye lens wherein said second frame eyepiece surrounds the second eye lens forming a continuously shaped, substantially rectangular aperture in which the second eye lens is mounted therein. A first ear piece is further mechanically coupled to the first temple, said first ear piece attached to the first temple by a first upward spring loaded, snap action, pivot hinge and a first earpiece detent including a spring loaded first cam location. A second ear piece is mechanically coupled to the second temple, said second ear piece attached to the second temple by a second upward spring loaded, snap action, pivot hinge and a second earpiece detent including a spring loaded second cam location, an integrally formed eyeglass encasement wherein said encasement is formed via an inward fold of the spring loaded, snap action, hinged nose mechanism and the mechanically coupled first and second eyepieces, first and second temples, and first and second earpieces. The encasement forms a jewelry-like, ornamental appearance in its fully enclosed configuration and forms a necklace attach point to hang the encasement therefrom via a mechanically coupled necklace loop that fully encloses the eyeglass lenses, a first and second lockable cam action, and spring loaded hinge. An intermediate first and second unfolded position is also provided that includes a first and second temple ear piece assembly wherein said assemblies are shaped, once folded, substantially the same as the eyepieces with substantially no overlapping view of said eyepieces. Finally, the apparatus includes spring actuated quick release mechanisms in the fully extended open position, and spring actuated quick release mechanisms in the fully retracted closed position.

In another embodiment, a reading glasses apparatus, comprises a first and second temple wherein the second temple includes a necklace attach point mechanically coupled about a spring loaded, snap action, pivoting intersection point to a second ear piece. The first temple is mechanically coupled about a spring loaded, snap action, pivoting intersection point to a first ear piece, said first and second ear pieces pivoting outwardly to form an extended position of the overall apparatus assembly mechanically coupled to said necklace attach point. The necklace attach point is further coupled via a necklace loop to provide a first carrying position for unfolded reading glasses such that said position for unfolded reading glasses is attained without removing said unfolded reading glasses from said mechanically coupled necklace loop or said first carrying position. Another aspect of the embodiment includes a first carrying position for folded reading glasses such that said position for folded reading glasses is attained without removing said folded reading glasses from said mechanically coupled necklace loop or said first carrying position.

Another aspect of the embodiment includes a multi-function folding reading glasses encasement that includes a first and second lockable cam action, spring loaded temple hinge. The spring loaded temple hinges, in combination, provide a quick release, two hand unfolding capability to receive the first and second eyepiece in a user optical viewing position from a position for the folded reading glasses encasement when interacting with the first and second cam action, spring loaded over center nose hinge. The over center nose hinge is further mechanically coupled to the first and second eyepiece holding a first and second lens mounted therein to facilitate inward folding and protection of the first and second lens.

Another embodiment includes a multi-function folding reading glasses apparatus wherein the extended first and second ear pieces pivot about a point located substantially equidistant from a proximal end and a distal end of the extended first and second ear piece and temple assemblies such that the inwardly pivoting folding operation of said first and second ear pieces join the proximal end of said first and second temples at a hinged point joining the first and second eye pieces and wherein said first and second ear pieces pivoting is a spring loaded, snap action, hinged mechanism mechanically coupled to join said first and second ear pieces to said first and second temples in a retracted position and an extended position.

Another embodiment includes a multi-function folding reading glasses apparatus wherein the spring loaded, snap action, hinged center nose mechanism is coupled to the first and second eye pieces and provides an open and closed position that includes a spring biased resistance and a cam action detent such that the force to overcome said open and closed position requires a two hand motion to operate.

Another embodiment includes a multi-function folding reading glasses apparatus that further comprises a closed configuration of the spring loaded, snap action, hinged center nose mechanism wherein the force to utilize the two hand motion is less than the force to overcome said spring bias resistance and cam action detent, and the spring biased resistance and cam action detent of the spring loaded, snap action, hinged center nose mechanism wherein the force to overcome said open and closed position changes the apparatus from said open position to said closed position or from said closed position to said open position thereby opening said spring loaded, snap action, hinged center nose mechanism from a locked previous position.

Another embodiment includes a multi-function folding reading glasses apparatus that further comprises the hinged, over center nose hinge midpoint that joins the first and second eye pieces and further provides a configuration having both an open and closed position. In certain aspects, the multi-function folding reading glasses further provide a quick release, rapid access optical viewing configuration. Such viewing configuration may be hung from a necklace loop in a first carrying position for the unfolded reading glasses.

Another embodiment of the invention includes a multi-function folding reading glasses apparatus that comprises first and second eye pieces of substantially the same shape when viewed from the front as the first and second temples and first and second ear pieces first inwardly folded together wherein said first inwardly folded configuration provides a collapsed first and second ear piece and temple assembly, said first and second ear piece and temple assembly pivoting inwardly about a first and second hinged point joining the first and second eye pieces with the first and second ear piece and temple assemblies such that the shape of the first and second ear piece and temple assemblies substantially covers the first and second eye pieces when the multi-function folding reading glasses are in the completely inwardly folded position to provide an encasement for said first and second eye pieces.

Another embodiment includes a multi-function folding reading glasses encasement, comprising the spring actuated quick snap open position wherein the hinged nose mechanism mechanically coupled to a first frame eyepiece via a first temple, said first frame eyepiece attached to a first eye lens and mechanically coupled to a first temple utilizing an outward folding hinge, rapidly unfolds into a fully extended position such that a one hand operation facilitates the unfolding via outwardly folding first and second ear piece and eye piece assemblies that overcome a first spring biased resistance and a first cam action detent.

Another embodiment includes a multi-function folding reading glasses encasement, comprising the spring actuated quick snap open position wherein the hinged nose mechanism mechanically coupled to a first frame eyepiece via a first temple, said first frame eyepiece attached to a first eye lens and mechanically coupled to a first temple utilizing an outward folding hinge, rapidly unfolds into a fully extended position such that a one hand operation facilitates the unfolding via outwardly folding first and second ear piece and eye piece assemblies that overcome a first spring biased resistance and a first cam action detent, and further comprising the spring actuated quick snap closed position wherein the hinged nose mechanism mechanically coupled to a first frame eyepiece via a first temple, said first frame eyepiece attached to a first eye lens and mechanically coupled to a first temple utilizing an inward folding hinge, rapidly folds into a fully collapsed position such that a one hand operation facilitates the inward folding via inwardly folding first and second ear piece and eye piece assemblies that overcome a second spring biased resistance and a second cam action detent.

According to one embodiment a method for folding reading glasses into a jewelry encasement is provided. The method typically includes the following steps: first, activating a nose hinge coupled to a first and second temple and ear piece assembly; folding inward a first and second eye piece lens to lens frame assembly; activating a first and second temple hinge in response to a completely inwardly folded lens to lens frame assembly; pivoting said first and second temple hinges via a spring loaded over center cam action mechanism; and activating a first and second ear piece hinge and pivot mechanism to invert said first and second ear piece into a lens to lens frame assembly encasement wherein the exterior of the lens to lens frame assembly encasement appears as a piece of jewelry.

In another aspect, the method further comprises pivoting said first and temple hinges via a spring loaded over center cam action mechanism that includes spring loaded plungers that follow the cam profile; providing a stop surface on the eye piece; providing a stop plane on the first and second temple piece; and providing a leaf spring to activate the first and second ear piece hinge and pivot mechanisms.

In another aspect, a method for folding reading glasses into a jewelry encasement further comprises mechanically coupling a necklace attach point eyelet from the jewelry encasement temple portion; mechanically coupling a necklace attach point eyelet from the jewelry encasement ear piece portion; hanging the jewelry encasement from a necklace chain; providing a low profile encasement height from the jewelry encasement; and holding the jewelry encasement in the closed position.

In another aspect, the method further comprises rapidly accessing the jewelry encasement from an open position of multi-function folding reading glasses wherein the jewelry encasement represents the fully closed position of the multi-function reading glasses; and facilitating said rapid access via a two hand operation wherein the nose hinge, first and second temple hinges, and first and second ear piece hinge pivot assemblies activate in a two step motion.

In another aspect, the method further comprises rapidly accessing the jewelry encasement from an open position of multi-function folding reading glasses wherein the jewelry encasement represents the fully closed position of the multi-function reading glasses; and facilitating said rapid access via a two hand operation wherein the nose hinge, first and second temple hinges, and first and second ear piece hinge pivot assemblies activate in one or more motions wherein said two hand operation, two step motion includes a first unfolding step to achieve an intermediate unfolded reading glass configuration and a second unfolding step to achieve a fully extended unfolded reading glass configuration such that said fully extended unfolded reading glass configuration provides a first carrying position for unfolded reading glasses such that said position for unfolded reading glasses and a quick release, rapid access optical viewing position such that said unfolded reading glasses may be hung from a necklace loop in a first carrying position for the unfolded reading glasses.

In another aspect, the method further comprises integrally forming the jewelry encasement thereby eliminating the need for a separate storage means wherein the jewelry encasement comprises a first and second ear piece in its folded position, a first and second temple in its folded position, and a first and second eye piece in its inwardly folded position such that the first and second ear pieces, first and second eye pieces, and first and second temples interact through the activation of spring loaded, cam action over center hinges such that the spring hinges snap into a first and second detent position utilizing a cam radius set inside of a overlapping lip in which an interacting edge is seated.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

Figure 1:
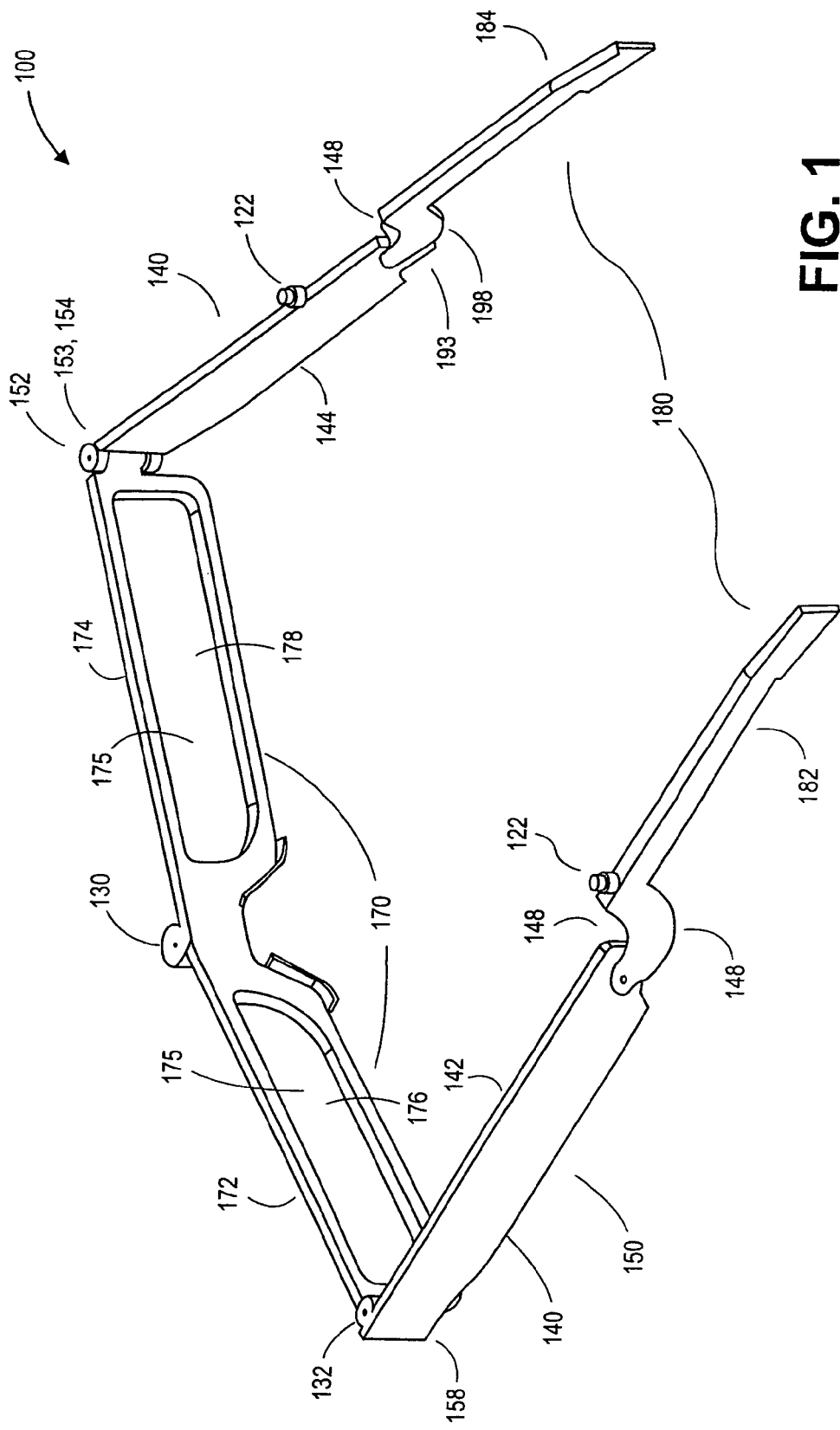
FIG. 1 illustrates a perspective view of an overall folding reading glass apparatus assembly wherein the ear pieces are configured in the extended position.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The embodiments of the enclosed invention introduce an improved method and apparatus of providing folding reading glasses, as illustrated in the overall apparatus perspective view of the overall apparatus folding reading glass assembly 100 shown in FIG. 1. Thereby, the overall apparatus perspective view of the present invention includes glasses that fold into a small jewelry shape encasement 110 (see FIG. 5) that is hung from a necklace 120 (see FIG. 25) and can be tucked in a pocket of a shirt or blouse (see FIG. 25). The eyeglass pieces fold inward on a hinge located at the nose 130. The lens to lens nose section folds inward toward the user. The lens to lens section is designed with an over center spring loaded center nose hinge and cam action interacting with the hinges and detents so as to open approximately 190 degrees, or with respect to a midpoint of the lens to lens section, 10 degrees beyond a 180 degree orientation from a first lens plane to a second lens plane. In the open position, the cams and spring are designed to be spring loaded and deflect about 10 or 20 degrees (e.g. preferably 15 degrees) to provide inward force toward the user. This is to facilitate stability on the head of the user. The over center spring loaded hinge is also designed to hold shut in the closed position.

The first and second temples 140 fold inward and are shaped, once folded, to create a first and second temple and ear piece assembly, a similar shape as the eyepieces 170 such that the eyepieces are substantially covered in the fully closed encasement position to protect the first and second eye lens. The temples 140 also serve as an encasement cover 150 thus protecting the lenses. The necklace attach points 122 let the folded glasses hang aesthetically and symmetrically in a usable open position 160 (not shown) that may be spring actuated for quick snap open or closed action. The eyepieces fold inward toward the user and are shaped the same to fold tightly together. The eyepieces 170 are also straight on a vertical plane so that they fold tightly together. The temples 140 are constructed in two pieces as described above, also straight on a vertical plane and once folded inward toward the eyepieces, serve to encase the eyepieces. The apparatus is comprised of six separate pieces including a first and second eye piece 172, 174, a first and second temple 142, 144, and a left and right ear piece 182, 184. The eye pieces will be joined together by an inward folding snap action hinge 132. The eyepieces will be attached to the temples 140 by outward folding hinges 132, 152 and the temples will be attached to the ear pieces 180 by an upward folding snap action hinge 148 through the use of detents 193, 194. The hinges will also be spring loaded with cam action so as to lock the glasses in the open 192 as well as closed 194 position (not shown). The frames will be selected from a group of high strength light weight materials consisting of aircraft grade aluminum, titanium, or molded composites to facilitate the necessary design features for the required strength and flexibility to provide inward force toward a user when worn and flexibility for rapid access, snap open and closed action.

In one aspect of the present invention, an apparatus for providing multi-function folding reading glasses is shown in FIG. 1. The overall apparatus folding reading glass assembly 100 comprises a hinged nose mechanism 130 mechanically coupled to a first frame eyepiece 172 via a first temple 142. The first frame eyepiece 172 is further attached to a first eye lens 176 wherein the first frame eyepiece 172 surrounds the first eye lens 176 forming a continuously shaped, substantially rectangular aperture 175 in which the first eye lens 176 is mounted therein, said first frame eyepiece 172 mechanically coupled to a first temple 142 utilizing an outward folding hinge 148. A second frame eyepiece 174 is further mechanically coupled to the hinged nose mechanism 130 via a second temple 144, said second frame eyepiece 174 attached to a second eye lens 178 wherein said second frame eyepiece 174 surrounds the second eye lens 178 forming a continuously shaped, substantially rectangular aperture 175 in which the second eye lens 178 is mounted therein. A second frame eyepiece 174 is mechanically coupled to a second temple 144 via a second temple hinge 148 and a second ear piece detent 193 including a spring loaded second cam location 198.

In certain aspects as further illustrated in FIG. 1, the first and second temple hinges 132, 152 are spring loaded and provide over center cam action to hold in the open as well as the closed position. A first ear piece 182 is mechanically coupled to the first temple 142, said first ear piece 182 being attached to the first temple 142 by a first upward folding snap action ear piece hinge 152 and a first earpiece detent 153 including a spring loaded first cam location 154. A second ear piece 184 is mechanically coupled to the second temple 144, said second ear piece 184 attached to the second temple 144 by a second upward folding snap action hinge 156 and a second earpiece detent 157 including a spring loaded second cam location 158. The first and second ear piece hinges 148, 198 are spring loaded and provide over center cam action to hold themselves shut, spring open when desired, hold open and spring shut when moved over center. The first and second ear piece hinges further feature, in certain aspects a spring metal leaf design that provides friction against the top edge of the ear in the open position and against the bottom portion of the ear swing in the closed position. The first and second ear piece hinges also provide friction and force along the cam section for the over center action of the swing during movement. The leaf spring is machine fit into the temple above the hinge point.

The first and second temple hinges are able to rotate approximately 180 degrees as illustrated in FIG. 1. The temple to lens connection spring cam comprises compression springs with durable plungers embedded into machined holes located on the temple. The cam on the lens or eye piece facilitates the over center action on the temple.

Also, as shown in FIG. 1, an integrally formed eyeglass jewelry shaped encasement 110 is provided wherein the encasement is formed via an inward fold of the hinged nose mechanism 130 and the mechanically coupled first and second eyepieces, first and second temples, and first and second earpieces. The encasement thereby forms a jewelry-like, ornamental appearance in its fully enclosed configuration and forms a necklace attach point 122 to hang the encasement therefrom via a mechanically coupled necklace loop 114 (not shown) and fully enclosing the eyeglass lenses. The overall apparatus assembly also provides a first and second lockable cam action hinge spring action position, said temples shaped, once folded, appearing the same as the eyepieces. Lastly, the overall apparatus folding reading glasses assembly provides a spring actuated quick snap open position, and a spring actuated quick snap closed position to provide rapid access to the reading glass lenses to be worn by a user.

Figure 2:
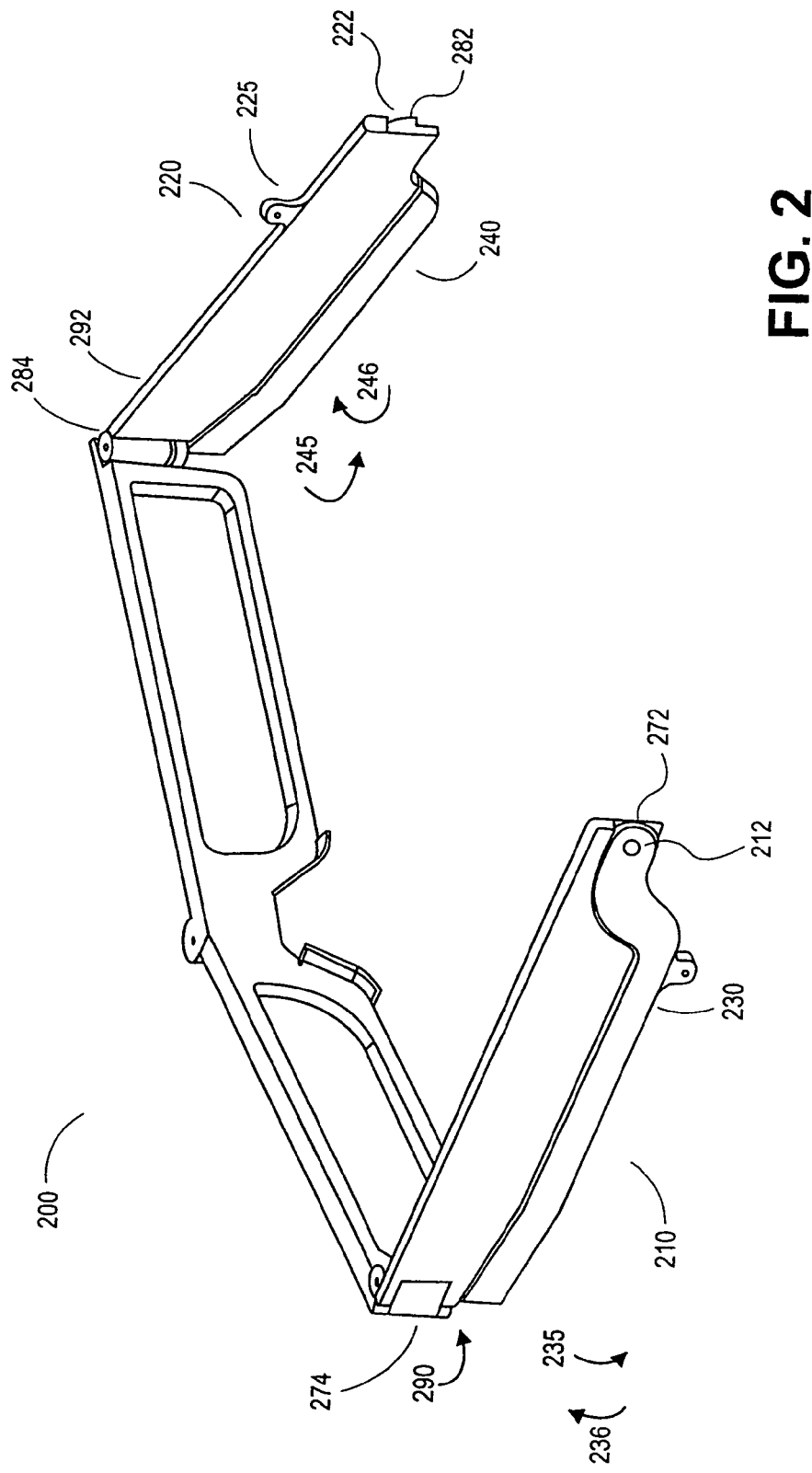
FIG. 2 illustrates a further perspective view of an overall folding reading glass apparatus assembly wherein the ear pieces are configured in the closed position.

According to another aspect of the present invention, a multi-function folding reading glasses apparatus is shown in FIG. 2. The apparatus 200 includes the first and second temple 210, 220 wherein the second temple includes a necklace attach point 225 mechanically coupled about a pivoting intersection point 222 to a second ear piece 240. The first temple 210 is mechanically coupled about a pivoting intersection point 212 to a first ear piece 230 and the first and second ear pieces 230, 240 pivot outwardly 235, 245 as previously shown in FIG. 1. The temple sections 210, 220 and ear piece sections 230, 240 form a first and second temple ear piece assembly 290, 292 shaped in a geometry to fully protect and encase the inwardly folded eye lens and frames pieces. In certain aspects, the resulting exterior surface of the encasement is shined and provided with offset edges such that the encasement has the overall appearance of a piece of jewelry hung from a necklace. The overall apparatus folding reading glass assembly 100 forms an extended position 102 of the overall apparatus assembly 100 to provide unfolded reading glasses.

Referring back to FIG. 1 the multi-function folding reading glasses apparatus, in certain aspects, further comprises a first and second lockable cam action eye piece hinge 132, 152 each with first and second spring action positions 154, 158 to provide rapid access to an optical viewing position. The optical viewing position requires a two hand unfolding operation to receive a first and second eyepiece 172, 174 in the user optical viewing position and the first and second eyepieces hold first and second lenses 176, 178 mounted therein.

Now referring back to FIG. 2, the first and second ear pieces 230, 240 pivot about a point 222 located substantially equidistant from a proximal end 272, 282 and a distal end 274, 284 of the extended first and second ear pieces 270, 280 such that the inwardly pivoting folding operation 236, 246 of said first and second ear pieces 270, 280 join the proximal end of said first and second ear pieces 272, 282 at the hinged nose point 130 joining the first and second eye pieces 172, 174.

In another certain embodiment of the invention aspects as generally illustrated further in FIG. 2 and further shown in FIG. 1, the eye piece hinges are shown in the apparatus for providing multi-function folding reading glasses perspective view. The eye piece hinges 132, 152 provide the hinged point joining the first and second eye pieces 172, 174, via an open and closed position. The first and second open and closed positions are created through the use of a first and second spring biased resistance and a cam action detents. The cams and detents are constructed such that the force to overcome said open and closed position only typically requires two hands to operate.

Figure 3:
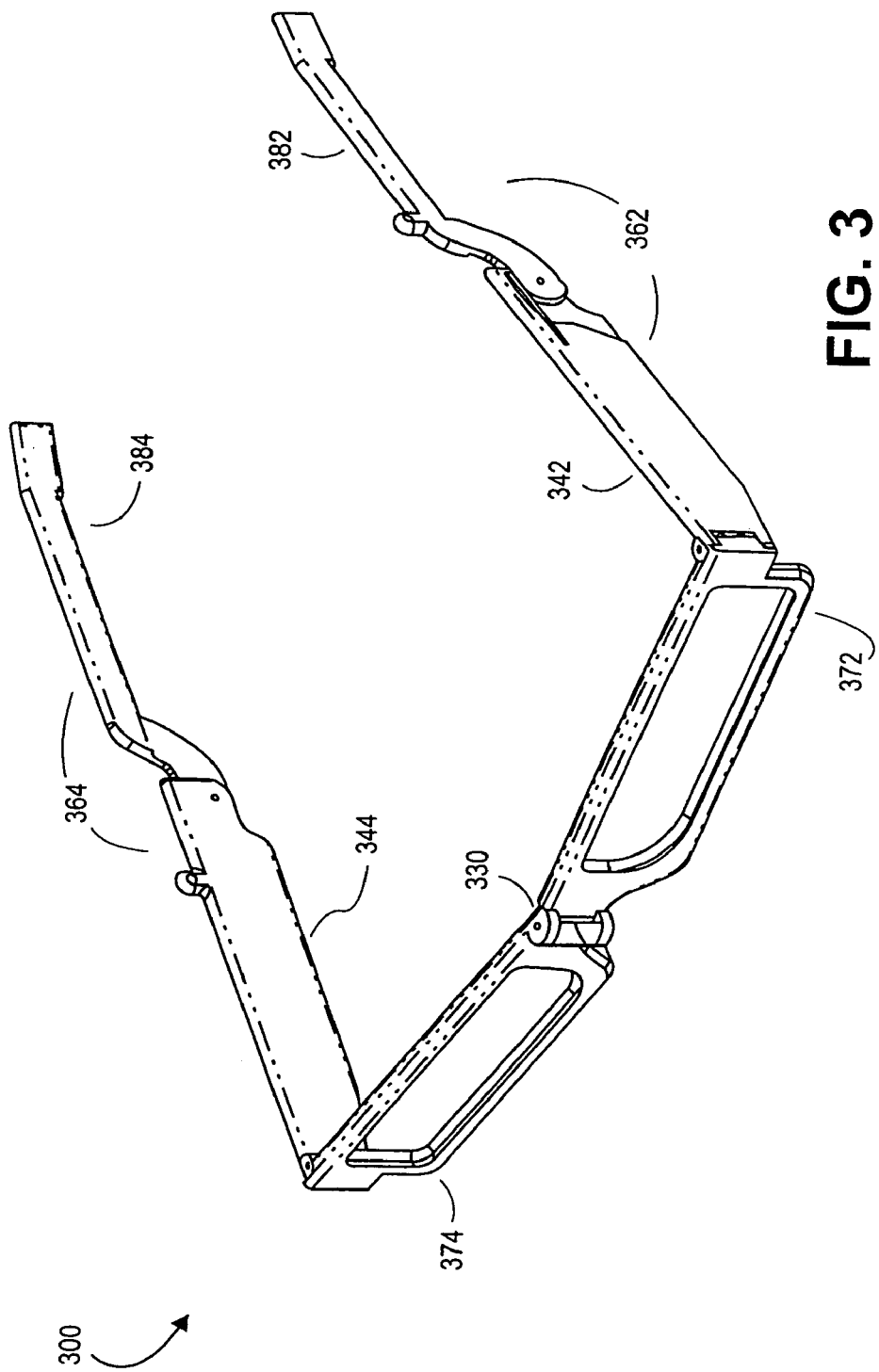
FIG. 3 illustrates an overall view of the folding reading glass apparatus assembly including a first and second eye piece, a first and second temple, and a first and second ear piece.
Figure 7:
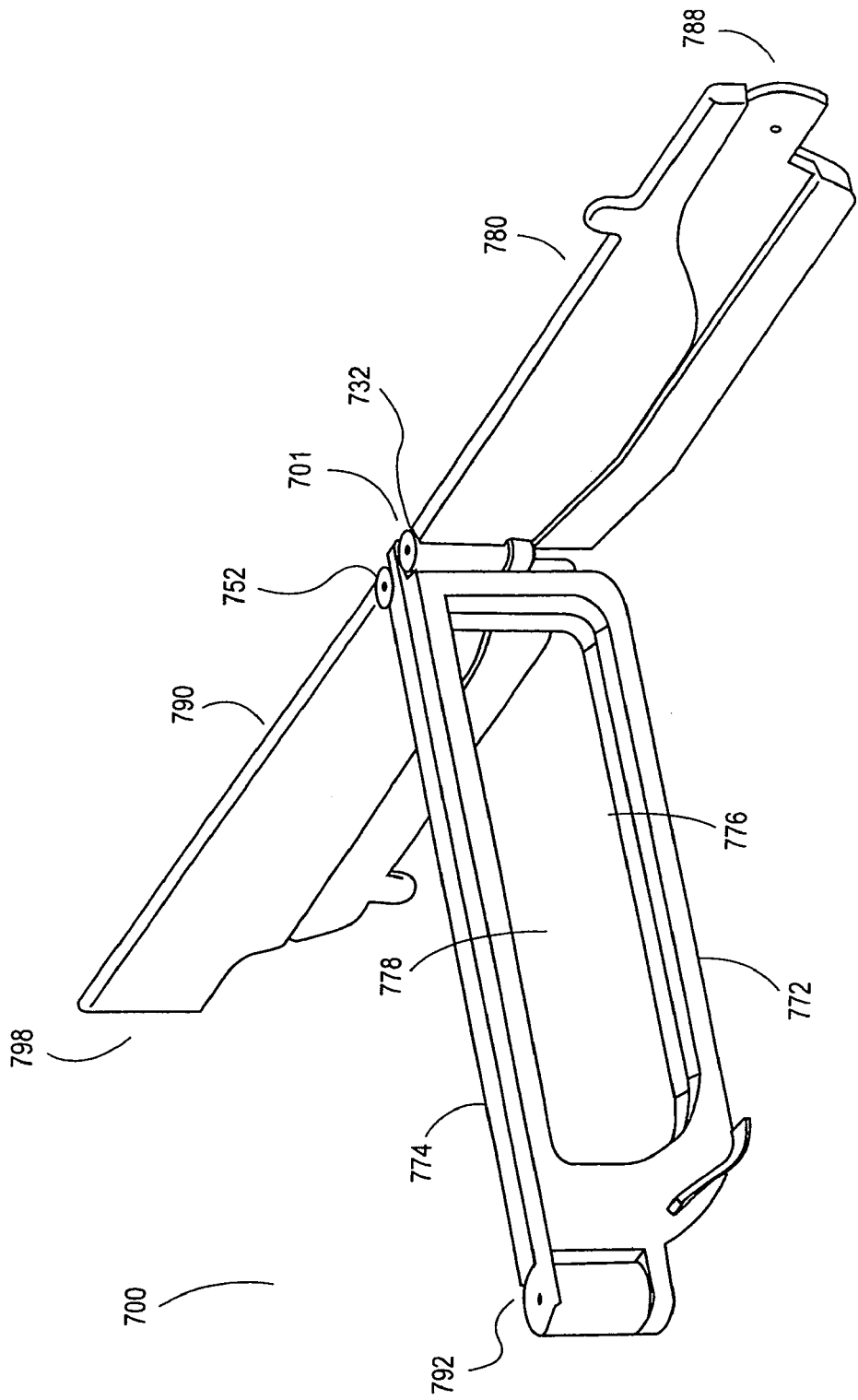
FIG. 7 illustrates a plan view of an intermediate position of the folding reading glass apparatus assembly in a partially collapsed position forming a T intersection and corresponding plan view.

In a further aspect of the present invention, FIG. 3 illustrates an exploded view of the folding reading glass apparatus assembly in a fully extended configuration 300 including a first and second eye piece 372, 374, a first and second temple 342, 344, and a first and second ear piece 382, 384. The folding reading glass apparatus assembly 300 is symmetrically constructed about a nose hinge 330 mechanically connected to a first and second eye piece wherein the first and second eye pieces including a substantially rectangular frame encompassing a first and second eye lens. The first and second eye lens are substantially straight to facilitate inwardly folding to an intermediate T position 200 as shown in FIG. 7. The first and second temple and ear piece assemblies 362, 364 pivot inwardly together to a point proximate to the nose hinge and substantially encompass the first and second lens in the completely folded position such that the first eye lens surface faces the second eye lens surface but do not engage said surfaces to prevent scratching or abrasions thereon. The folded first and second temple and ear piece assemblies 362, 364 substantially encompass the first and second eye pieces and lenses to integrally form a collapsed encasement.

Figure 4:
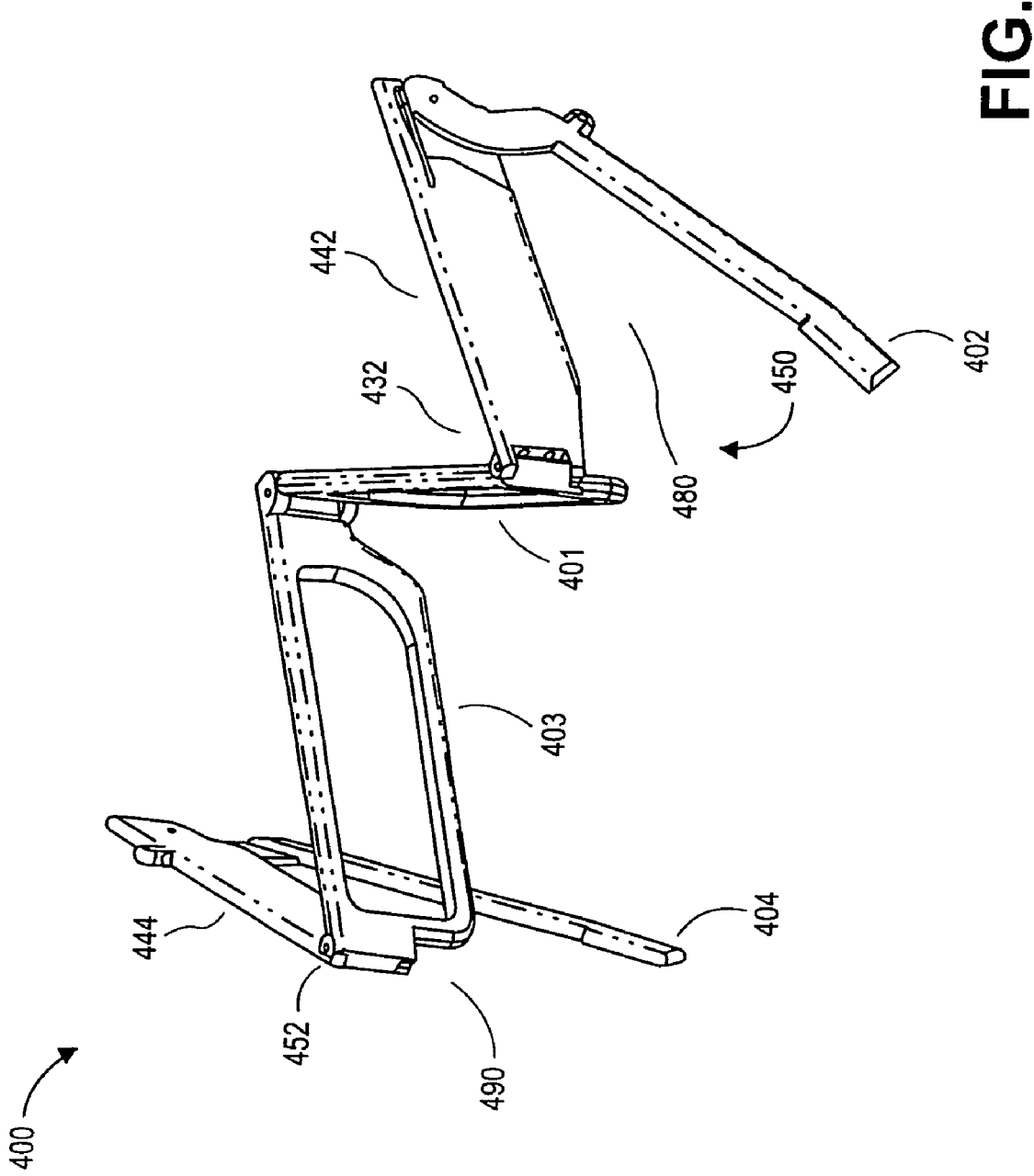
FIG. 4 illustrates the distal end of a first and second ear piece in the extended position and the distal pivot pin outwardly disposed such that the first and second ear piece pivots to reach the fully extended position.

FIG. 4 illustrates the distal end of the first and second ear pieces 402, 404 in the extended position 400 and the distal pivot pin 408, 410 outwardly disposed to reach the extended position 400 and away from the eye piece hinge 432, 452 according to another embodiment. The distal end of the first and second ear pieces 402, 404 in its fully folded position 450 is adjacent to the first and second eye piece hinges 432, 452 that mechanically couple the first and second eye pieces 402, 404 to the first and second temples 442, 444. The distal ends of the first and second ear pieces 402, 404 are adjacent to the first and second eye piece hinges 432, 452 in the fully folded position 450 such that the first and second ear piece assembly 480, 490 is substantially shaped in the front view perspective as the front view of the first and second eye frame pieces 401, 403.

Figure 5:
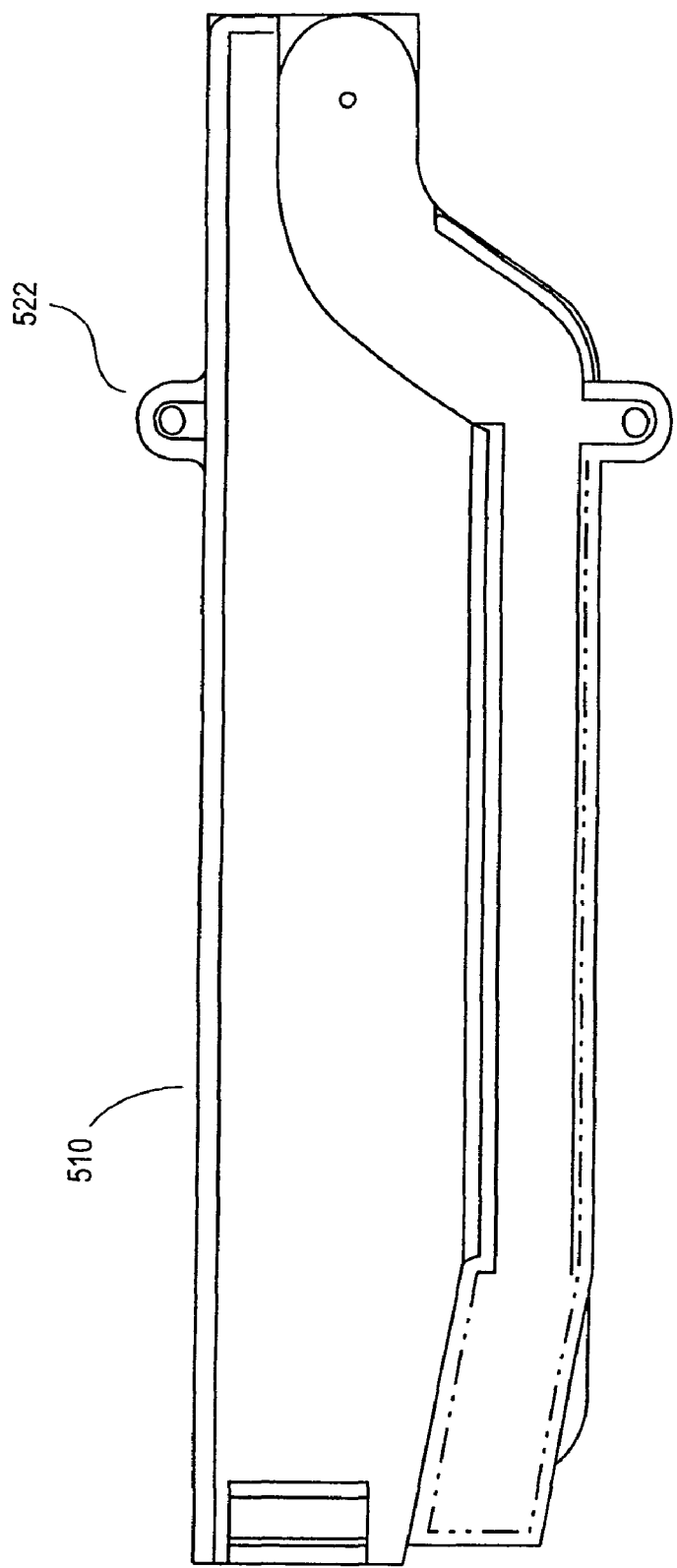
FIG. 5 shows a front view of the folding reading glass apparatus assembly in its fully collapsed encasement position wherein the necklace attach point is on the right hand side of the assembly.

FIG. 5 shows a front view of a folding reading glass apparatus assembly in its fully collapsed encasement position according to one embodiment wherein the necklace attach point is on the right hand side of the assembly. The necklace attach point 522 is formed in the shape of an eyelet such that the fully collapsed assembly, integrally formed encasement 510 is held comfortably in a utility position similar to the position of a traditional held standard reading glasses in the open position. Also, the eyelet provides a convenient position to symmetrically hold the integrally formed encasement mechanically coupled to a necklace chain giving the appearance of a piece of jewelry.

Figure 6A:
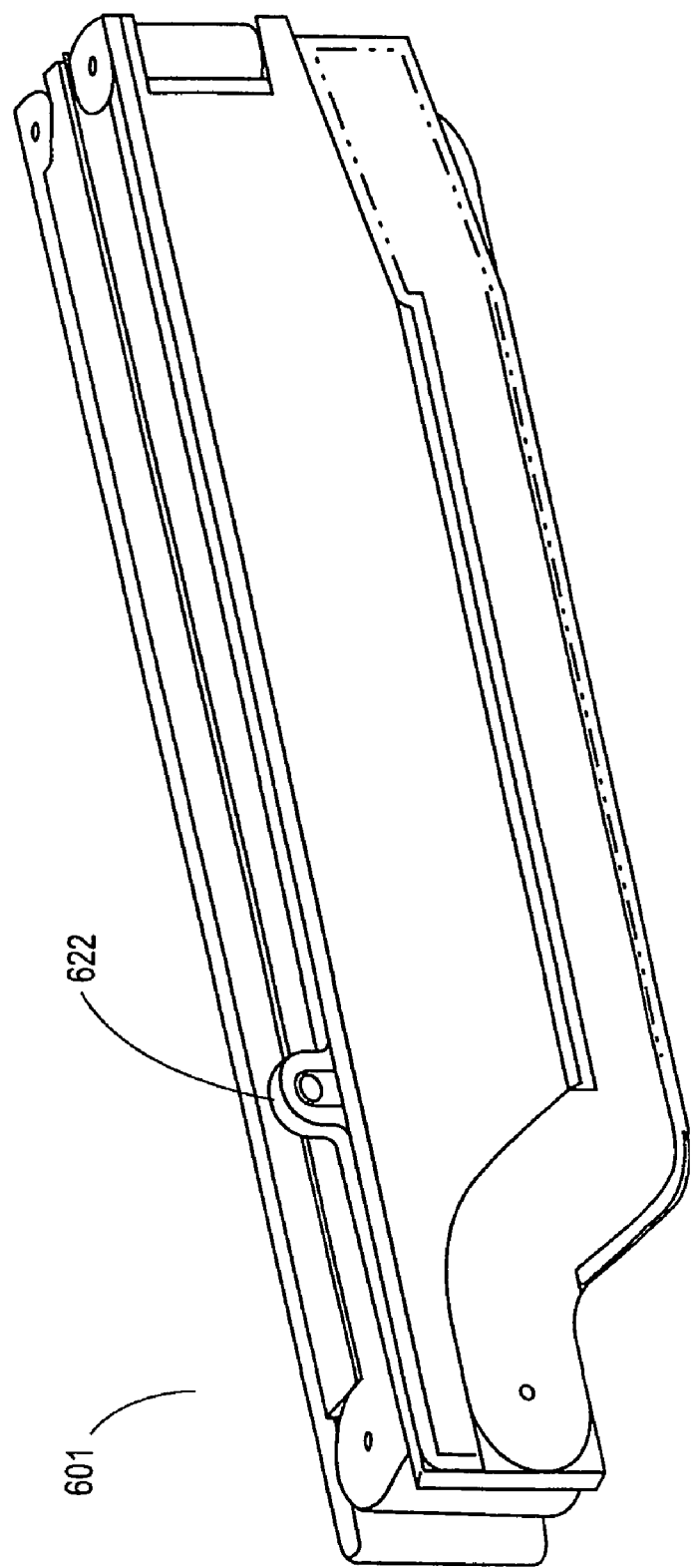
FIG. 6 shows a front view of the folding reading glass apparatus assembly in its fully collapsed encasement position wherein the necklace attach point is on the left hand side of the assembly in FIG. 6a and the necklace attach point on the right hand side in FIG. 6b.
Figure 6B:
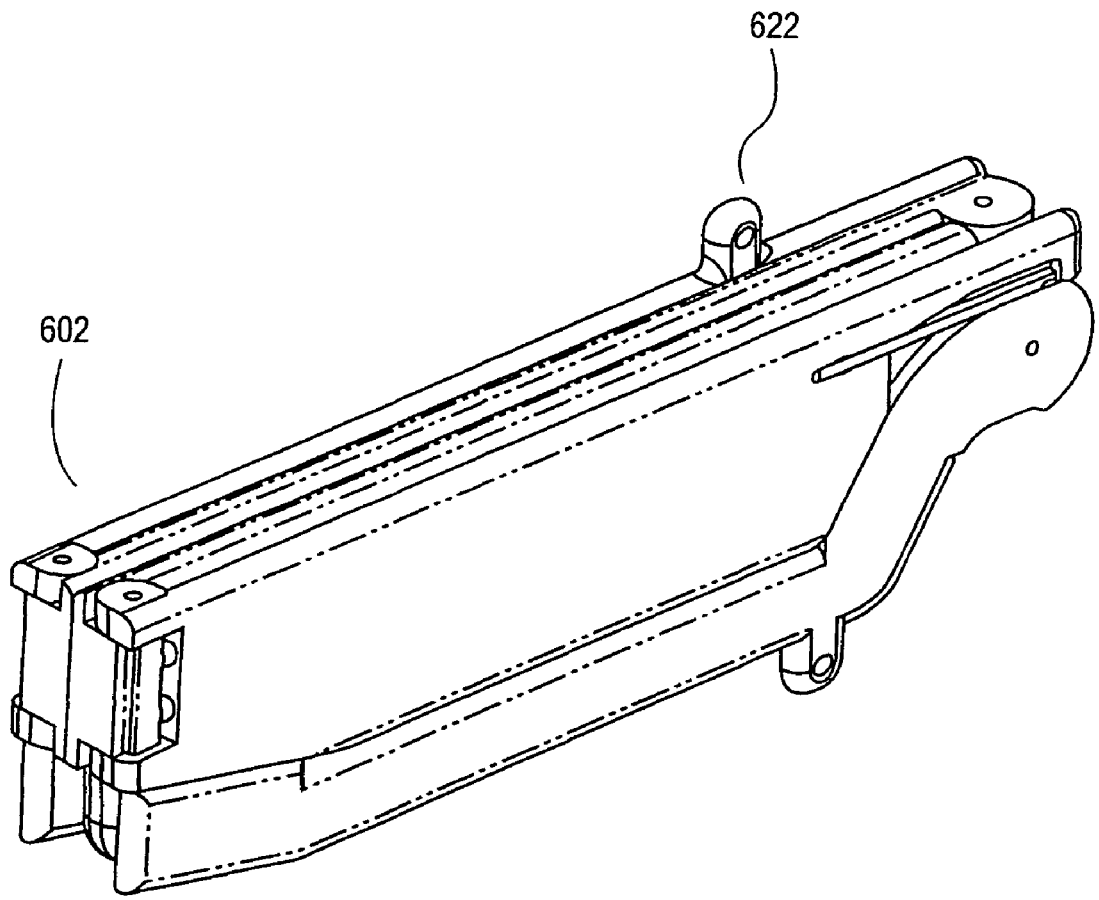

FIG. 6A shows a front view of a folding reading glass apparatus assembly in its fully collapsed encasement position according to one embodiment wherein the necklace attach point is on the left hand side of the assembly 601. The necklace attach point 622 is similarly formed in the shape of an eyelet as described above for FIGS. 5 and 6A except now oriented from the opposite direction 602 as shown in FIG. 6B. The necklace attach point 622 is a mirror image of the identical necklace attach point 522 as shown in FIGS. 5 and 6A and provides a utility position in the open and closed positions as a mirror image of the similarly described positions above.

FIG. 7 illustrates a plan view of an intermediate position of the folding reading glass apparatus assembly 700 according to one aspect. The folding reading glass apparatus assembly is shown in a partially collapsed position forming a T intersection 701 and the corresponding plan view. The partially collapsed intermediate position 701 is symmetrically disposed by the first ear piece and temple assembly 780 and the second ear piece and temple assembly 790 distal ends 788, 798 equidistant from the first and second ear piece hinges 732, 752. The first and second eye frame pieces 772, 774 are folded inward wherein the first and second eye lenses 776, 778 face each other when fully folded inward into the closed position 792 such that the first ear piece hinge 732 and the second ear piece hinge 752 are substantially adjacent to one another. Further, the first and second eye frame pieces 772, 774 are substantially the same front view and mirror image of each other such that when folded inward together the first and second eye frame pieces 772, 774 substantially encase each other while the first and second ear piece hinges 732, 752 provide a clearance such that the first and second eye lenses 776, 778 do not scratch or otherwise contact each other. The first and second ear piece assemblies 780, 790 are shaped substantially the same so as to protect and encase the first and second eye lenses 776, 778.

Figure 8:
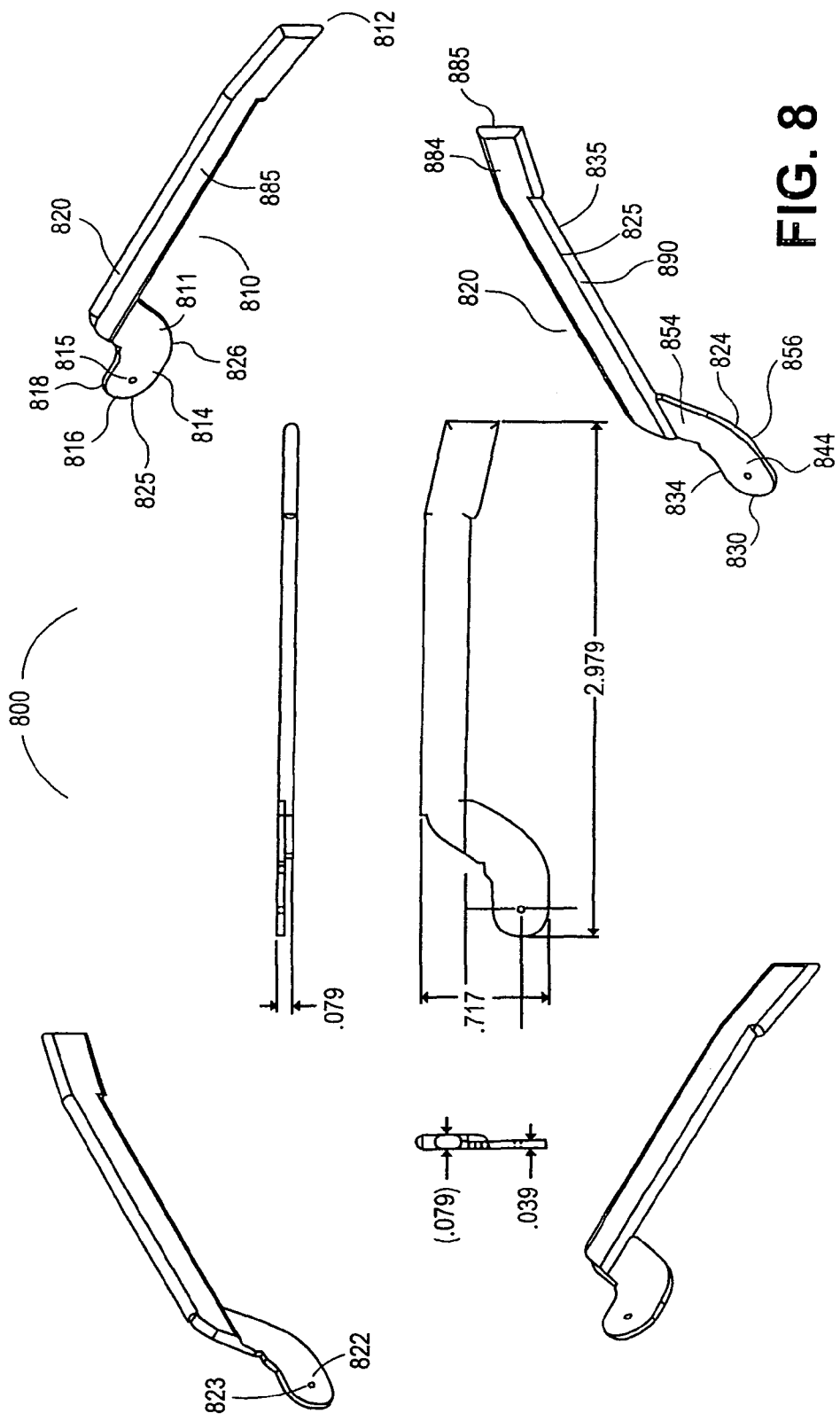
FIG. 8 illustrates an exploded view of a right (first) ear piece.

FIG. 8 illustrates an exploded view 800 of a right (first) ear piece 810 according to one embodiment. The right (first) ear piece 810 includes a distal end 812 constructed of a first semi-circular tab 814 allowing the first ear piece to pivot about a point 815 equidistant from the first semi-circular tab end 816 wherein the radius of said tab center point 815 defines a tab end 816 of a thickness 818 required to determine the strength necessary to function as a support member. The thickness of said tab is less than the thickness of the mechanically coupled first ear piece body 820 wherein said first ear piece body 820 is formed via a plurality of manufacturing processes. The first ear piece body 820 is mechanically coupled to the first semi-circular tab 814 and is formed by an overall manufacturing process selected from the group consisting of one or more machining processes, one or more casting processes, and one or more molding processes. The center point 815 of the first semi-circular tab end 816 is formed with an aperture of diameter substantially greater than a first distal pivot pin 822 cross section diameter such that the first distal pivot pin 822 rotates freely in the stamped center point aperture 823.

As further illustrated in FIG. 8, the first ear piece 810 forms an ear piece cam surface 811 that pivots freely at an end distal 812 from the first ear piece and first temple assembly hinge 832 such that when the first ear piece 810 is fully extended, the first ear piece 810 is in a fully inverted configuration from its position prior to pivoting. The first semi-circular tab 814 is elongated in a first radius 825 curvature in accordance with a second curvature radius 826 about a point outside a first edge 824 and a second edge 834. The second curvature radius 826 is substantially greater than said first radius wherein said first edge 824 and second edge 834 forms a continuous edge 830 about the semi-circular tab end portion 844. The continuous edge similarly encompasses the semi-circular elongated portion 854 in a curved portion 856. The semi-circular elongated portion cam surface 854 is mechanically coupled to the semi-circular tab 814 along with the first ear piece body 820 such that the semi-circular tab and the semi-circular elongated portions are offset to form a pivot arm geometrical shape, ear piece cam surface 811. The first ear piece body 820 is formed such that a first edge 824 and a second edge 834 of a front face panel 884 is a substantially smaller cross section than a first edge 825 and a second edge 835 of a rear face panel 885 such that said edges form a sloped surface 890 connecting from said front face panel 884 to said rear face panel 885 in a continuous edge around said first ear piece body. The edges are smoothly finished and said front and rear face panels 884, 885 are shined to provide an ornamental appearance similar to that of jewelry.

Figure 9:
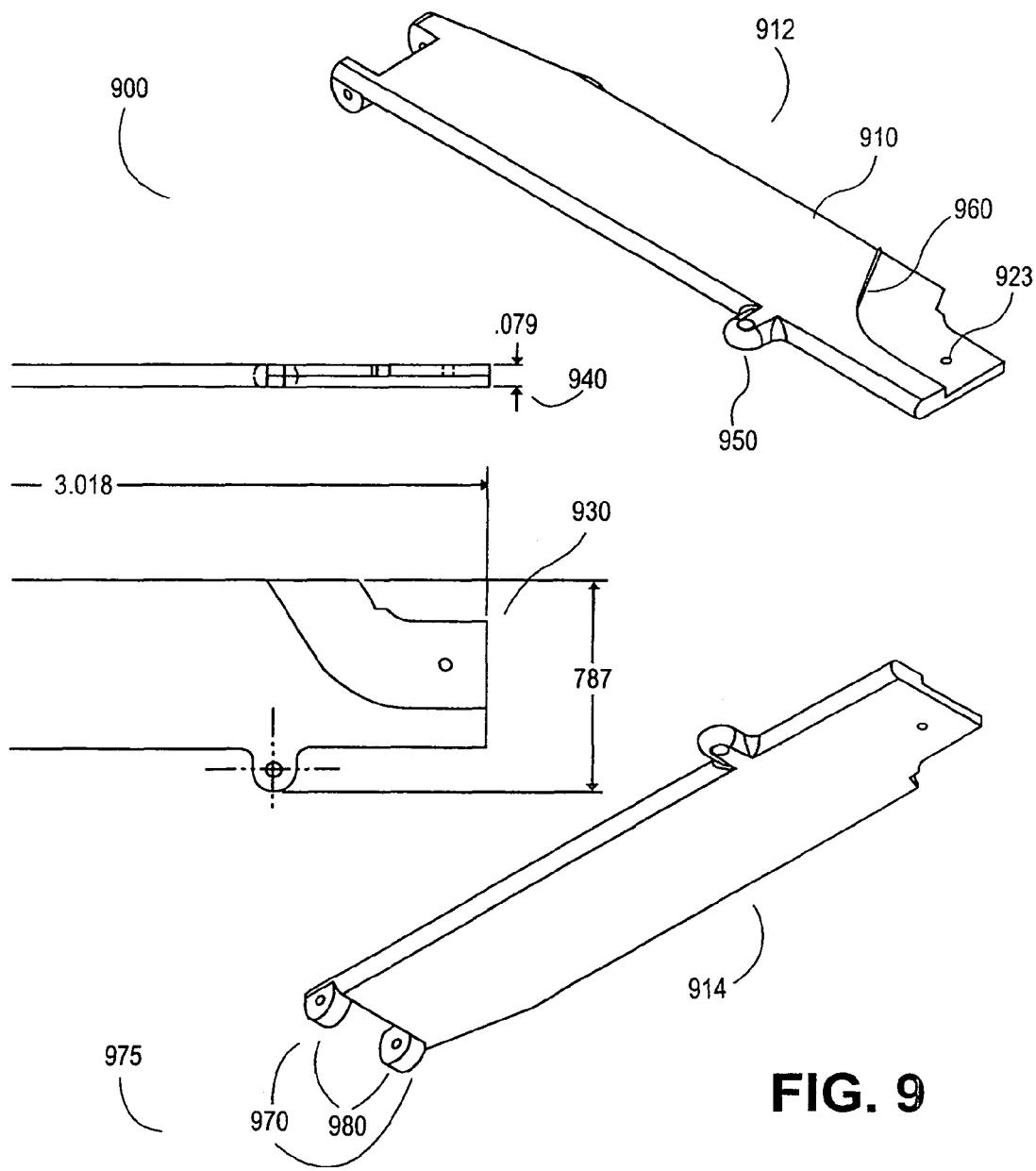
FIG. 9 is an exploded view of a right (first) temple including the necklace attach point.

In another aspect of the present invention, FIG. 9 is a collection of views 900 including a top and bottom perspective view 912, 914, a front view detail 930, and a top cross section view 940 of a right (first) temple 910 showing the necklace attach point 950. In the top perspective view 912, a curved recess 960 is substantially shaped in the geometry of the semi-circular elongated portion 854 of the first ear piece 810 as described above in FIG. 8. The curved recess 960 locates a pin aperture 923 that is aligned with the stamped center point aperture 823 as discussed above such that a pivot pin 822 rotates freely through apertures 823 and 923 until the first ear piece 810 pivots to a fully extended position wherein the first temple 910 is fully inverted from its closed position.

In the bottom perspective view 914 of a first temple, a first temple hinged mounting mechanism 970 is shown at a point proximate to the eye piece hinge assembly 980 such that the eye piece hinge 980 and hinged mounting mechanism 970 interact together to form the hinged pin component 975 as shown in FIG. 9. When fully assembled and interacting, the hinged mounting mechanism 970 and hinged pin component provide a first temple hinge assembly that provides an over center bias action to provide angular movement up to 90 degrees from the closed point of reference. The bottom view also illustrates the necklace attach point 950 that facilitates a chain attachment to a person such that the folding reading glasses apparatus are integrally attached to a person while the folding reading glasses apparatus are the open or closed position. Finally, the bottom perspective view further locates the pin aperture 923 such that the ear piece and temple are mechanically coupled to create an intermediate folded position and a fully extended position.

Figure 10:
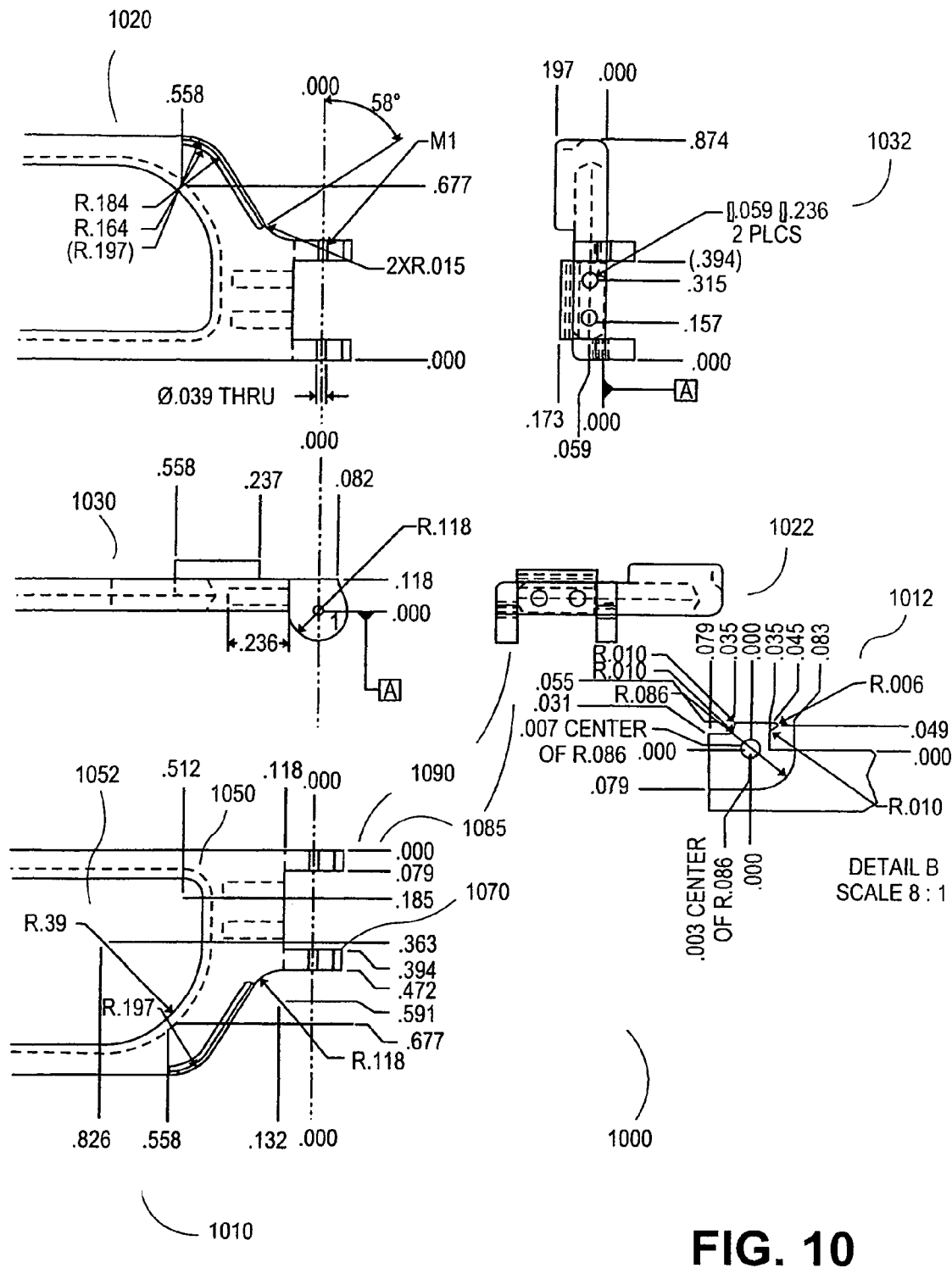
FIG. 10 illustrates an exploded view of a right (first) eye piece.

FIG. 10 illustrates a detail exterior view of a right (first) eye piece according to one aspect. The detail view of a first eye piece 1000 includes a front view 1010, an inverted front view 1020, a top view 1030 and side views 1012, 1022, 1032 of each. The first eye piece 1000 comprises a first frame 1050 that encompasses a first lens 1052 mounted therein. The first eye piece frame 1050 is integrally formed to a hinged mounting mechanism 1090. The first eye piece hinged mounting mechanism 1090 may be joined to the first eye piece frame 1050 via an overall manufacturing process selected from the group consisting of one or more molding processes, one or more fastening means, and one or more bonding means. The first eye piece hinged mounting mechanism 1090 interacts together with the first temple hinged mounting mechanism 1070 and hinged pin component 1075 to create a first temple hinge assembly 1085 that provides an over center bias action to facilitate angular movement of up to 90 degrees from the closed point of reference as described above with respect to the first temple 910.

Figure 11:
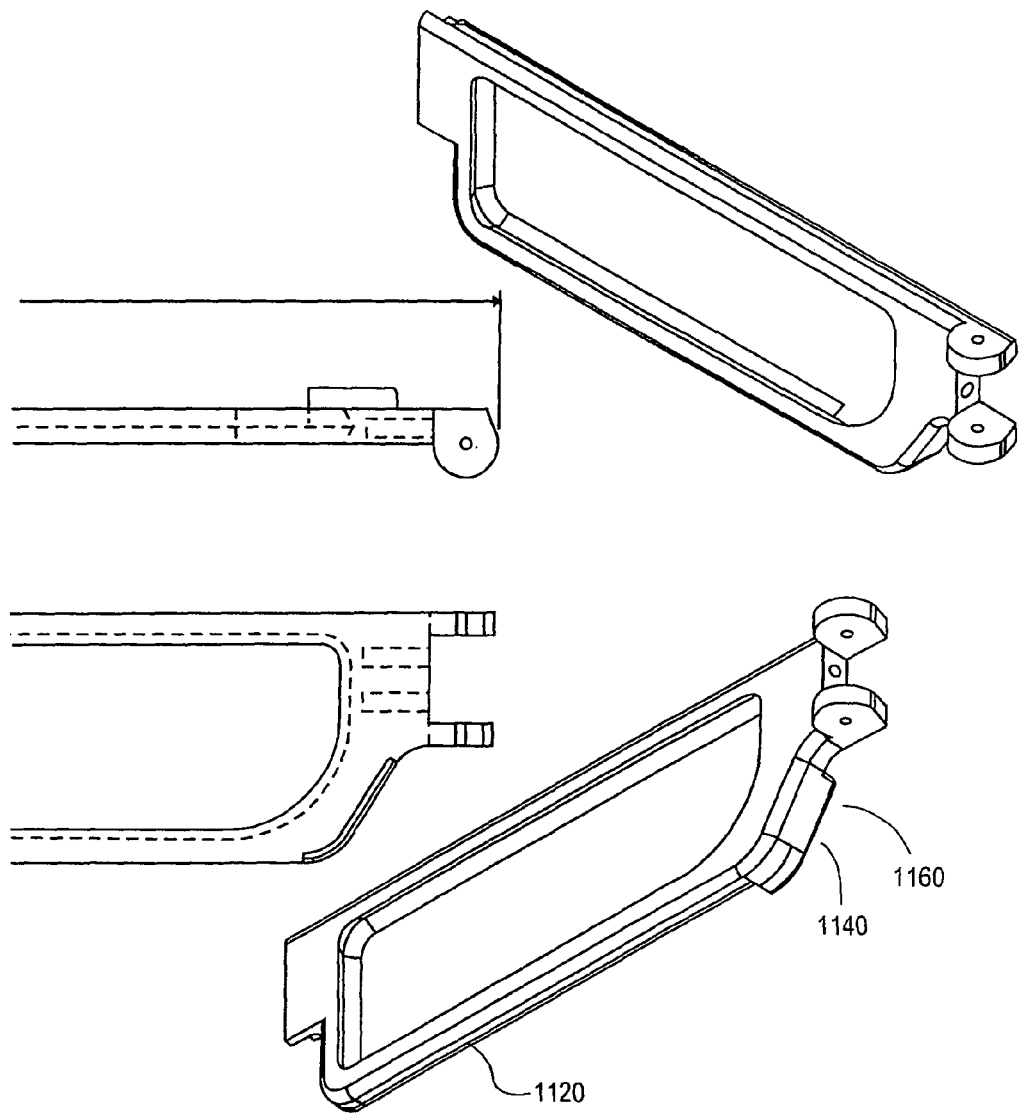
FIG. 11 is a perspective view of a right (first) eye piece.

FIG. 11 illustrates a detail interior view of a right (first) eye piece with the components as described in FIG. 10. The interior view further illustrates a first eye piece frame lower support 1140 of a first eye piece nose bridge assembly 1160 wherein the first eye piece nose bridge assembly is mechanically coupled to the first eye piece frame via an overall fastening means, the fastening means selected from a group consisting of a snap fit tab, threaded fasteners and adhesives. The first eye piece frame lower support 1140 is positioned on the first eye piece frame lower portion 1120 such that when worn by a user the first eye piece frame lower support provides an interference fit due to its flexible, pliable material construction. The first eye piece frame lower portion 1120 therefore fits tightly across the nose of a user such that the glasses are secured on the face of the user.

Figure 12:
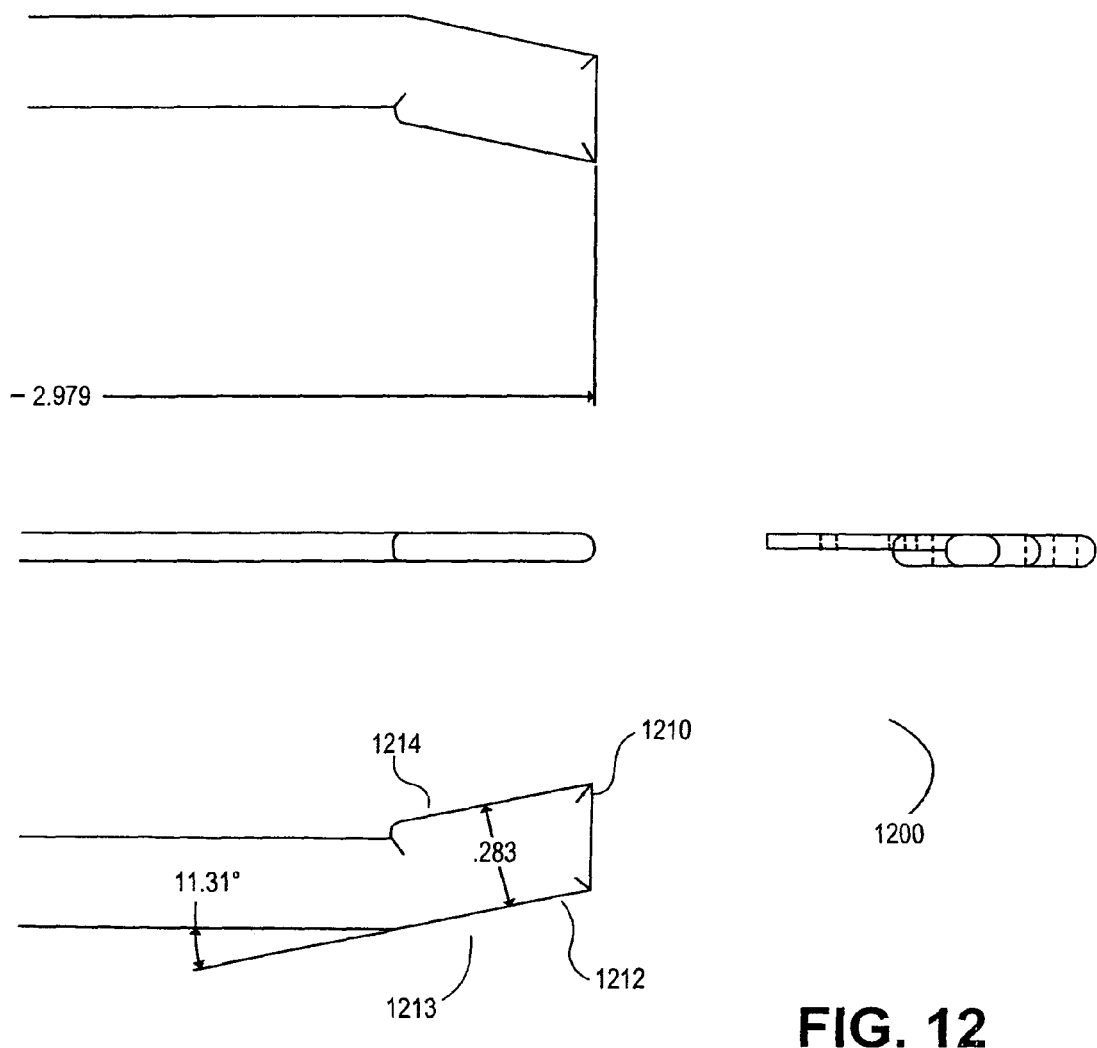
FIG. 12 is a top plan view of a left (second) ear piece.

FIG. 12 is a detail view of the distal end in both an upright and inverted configuration, top plan, and bottom plan view of a left (second) ear piece according to one aspect. The detail view of the distal end 1200 includes an upright view of the second ear piece distal end 1210 wherein the outer edge 1212 of the distal end second ear piece adjoins an upper and lower angled edge 1213, 1214 wherein the center of the vertical height is substantially equidistant from said upper and lower edge before offset by an angle. The outer edge 1212 of the distal end second ear piece is offset by an angle of between about 10 degrees and 20 degrees, preferably 11.31 degrees such that the angled offset is substantially the same as the angled offset of the second temple lower edge wherein the lower edge of the distal end second ear piece and the second temple lower edge are substantially parallel.

Figure 13:
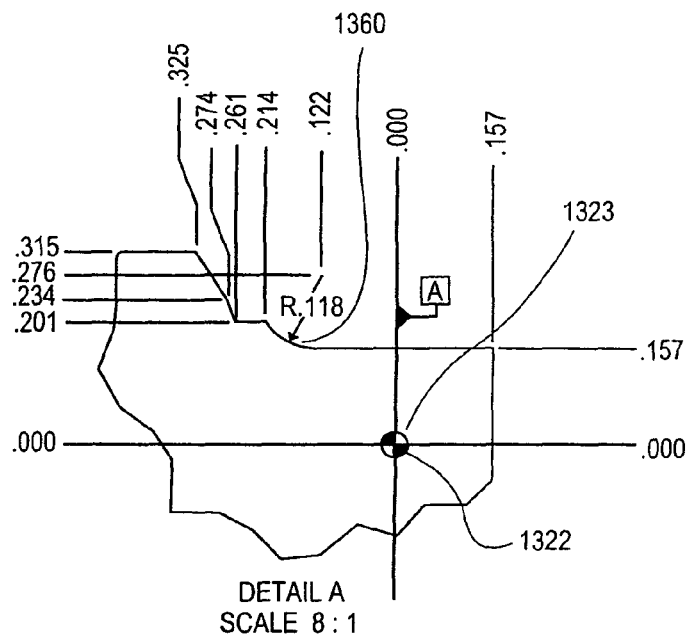
FIG. 13 is a top plan view of a left (second) temple.
Figure 13:
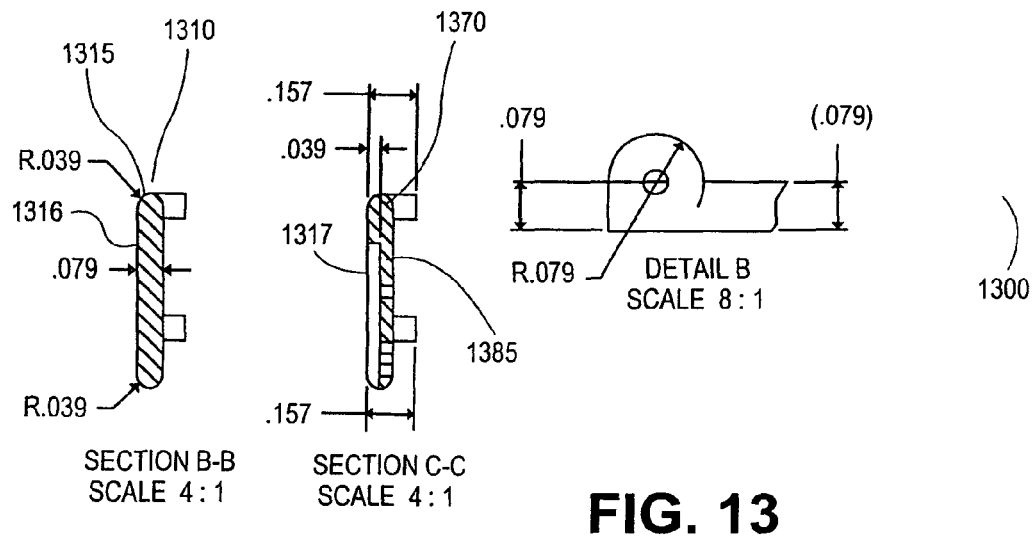

In a further aspect of the present invention, shown in FIG. 13, the top plan and detail view 1300 of a left (second) temple 1310 is illustrated. As described above, the curved recess 1360 locates a pin aperture 1323 that is aligned with the stamped center point aperture 1323 such that a pivot pin 1322 rotates freely through aperture 1323 until the first ear piece 810 pivots to a fully extended position wherein the second temple 1310 supports a fully inverted second ear piece 1202 in its extended position 1205. A second temple hinged mounting mechanism 1370 is also shown in the detail view portion of 1300 wherein a cross section top plan view of the hinged mounting mechanism 1370 captivates a rotating pin through an aperture with a substantially larger diameter than the pin diameter. The hinged mounting mechanism 1370 is mechanically coupled to the second temple body 1315 wherein the exterior view of the second temple body 1316 is molded across the rear of the hinged mounting mechanism 1370 while the interior view of the second temple body 1317 reveals the entire hinged mounting mechanism side view. The hinged mounting mechanism interacts with the second eye piece spring hinge component to create a second temple hinge assembly 1385 that provides an over center bias action to facilitate angular movement of up to 90 degrees from the closed point of reference as described above with respect to the second temple 1310.

Figure 14:
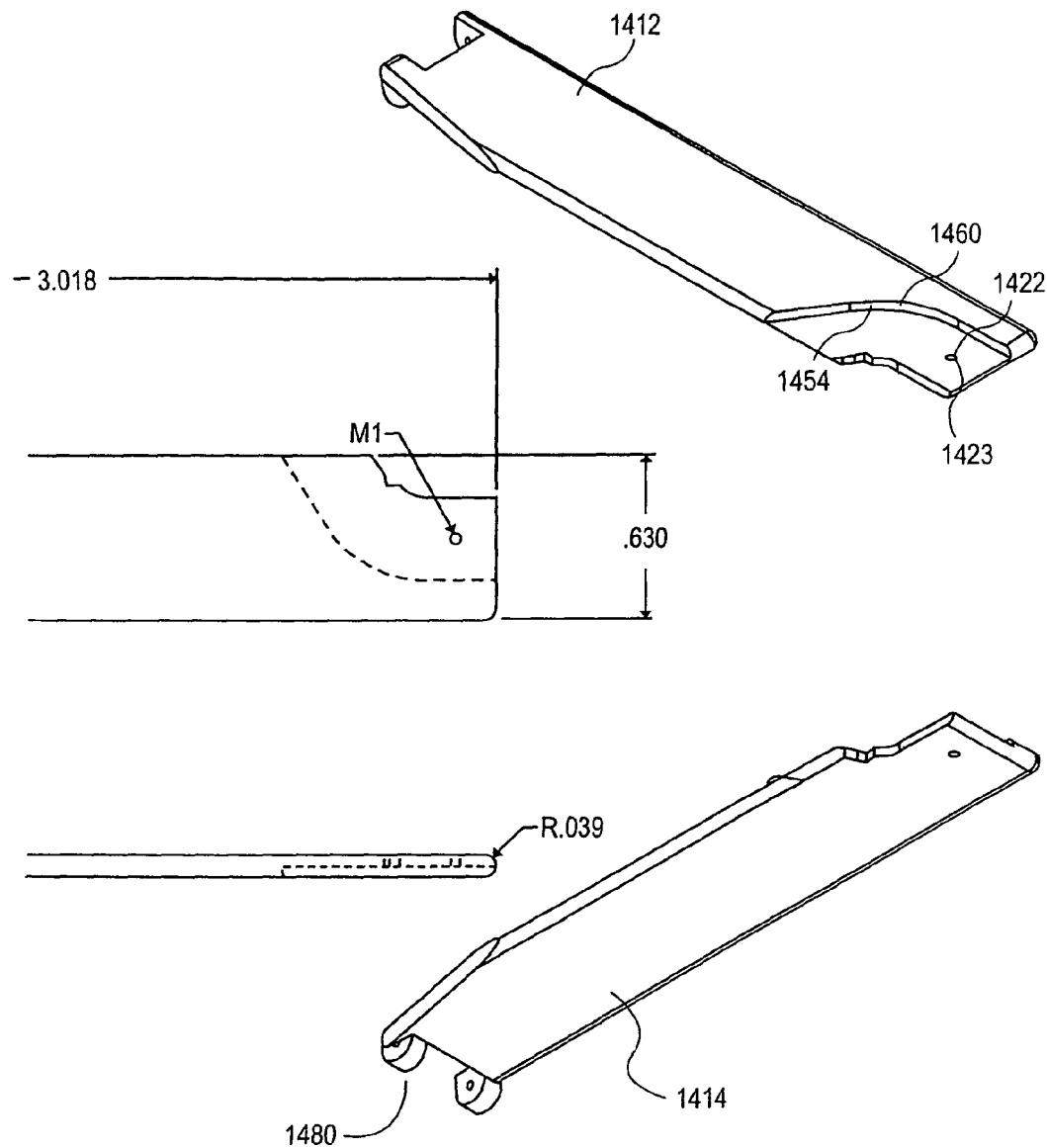
FIG. 14 illustrates a perspective view of a left (second) temple.

FIG. 14 illustrates a perspective view of a left (second) temple. In the top perspective view 1412, a curved recess 1460 is substantially shaped in the geometry of the semi-circular elongated portion 1454 of the second ear piece 1310 as described above. The curved recess 1460 locates a pin aperture 1423 that is aligned with the stamped center point aperture 1323 as discussed above such that a pivot pin 1422 rotates freely through apertures 1323 and 1423 until the second ear piece 1310 pivots to a fully extended position wherein the second temple 1310 is fully inverted from its closed position. In the bottom perspective view 1414 of a second temple, a second temple hinged mounting mechanism 1370 is shown at a point proximate to the second eye piece hinge assembly 1480 such that the second eye piece hinge 1480 and hinged mounting mechanism 1370 interact together to form the hinged pin component 1375. When fully assembled and interacting, the hinged mounting mechanism 1370 and hinged pin component 1375 provide a second temple hinge assembly 1385 that provides an over center bias action to provide angular movement up to 90 degrees from the closed point of reference. Finally, the bottom perspective view further locates the pin aperture 1423 such that the ear piece and temple are mechanically coupled to create an intermediate folded position and a fully extended position.

Figure 15:
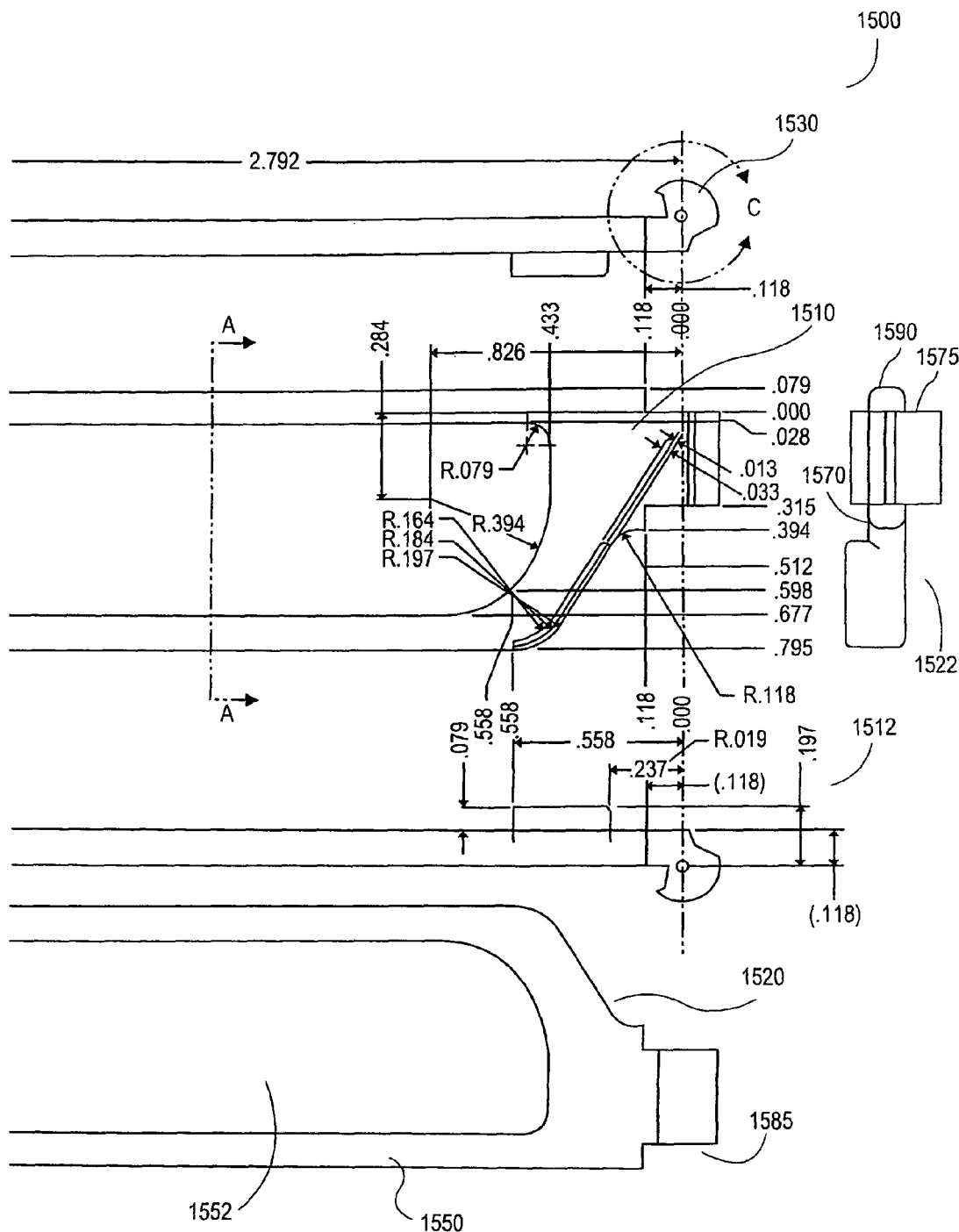
FIG. 15 illustrates a front view of the left (second) eye piece.

FIG. 15 illustrates a front exterior view of the left (second) eye piece. The detail view of a second eye piece 1500 includes a front view 1510, an inverted front view 1520, a top view 1530 and side views 1512, 1522, 1532 of each. The second eye piece 1500 comprises a second frame 1550 that encompasses a second lens 1552 mounted therein. The second eye piece frame 1550 is integrally formed to a hinged mounting mechanism 1590. The second eye piece hinged mounting mechanism 1590 may be joined to the second eye piece frame 1550 via an overall manufacturing process selected from the group consisting of one or more molding processes, one or more fastening means, and one or more bonding means. The second eye piece hinged mounting mechanism 1590 interacts together with the second temple hinged mounting mechanism 1570 and hinged pin component 1575 to create a second temple hinge assembly 1585 that provides an over center bias action to facilitate angular movement of up to 90 degrees from the closed point of reference as described above with respect to the second temple 1410.

Figure 16:
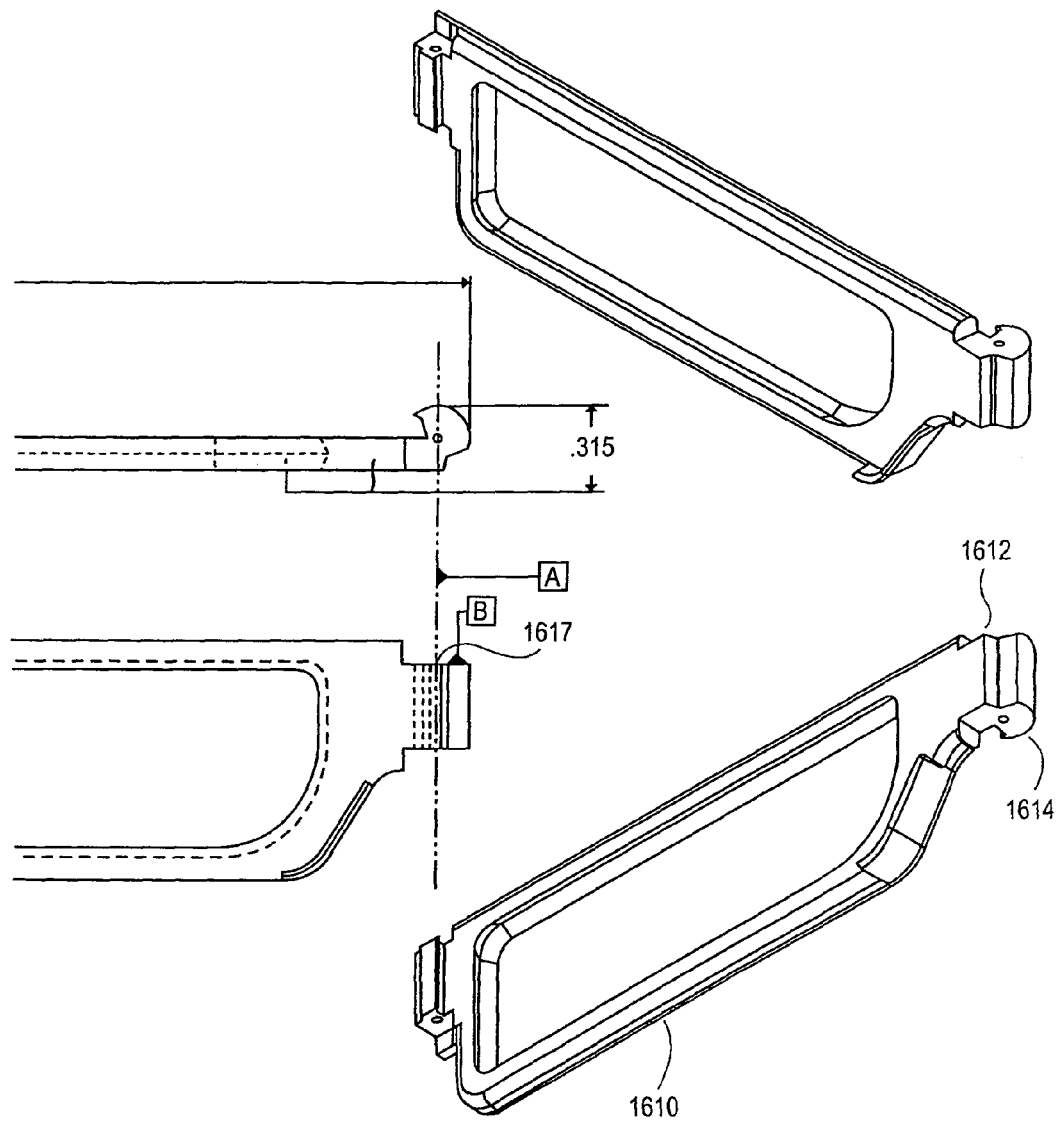
FIG. 16 illustrates a perspective view of a left (second) eye piece.

FIG. 16 illustrates a perspective view of a left (second) eye piece. The second eye piece 1610 outer edge 1612 proximate to the nose hinge assembly provides a hinged mounting mechanism 1614 mechanically coupled to the second eye piece frame 1550 wherein the mechanically coupled hinged mounting mechanism is integrally formed in a continuously manufactured process as specified above. The second eye piece 1610 outer edge 1616 proximate to the temple provides a hinged mounting mechanism 1617 mechanically coupled to the second temple 1310 such that a temple hinge, when fully assembled and interacting, along with the hinged mounting mechanism 1370 and hinged pin component 1375 provide a second temple hinge assembly 1385 that provides an over center bias action to provide angular movement up to 90 degrees from the closed point of reference between the second eye piece and second temple.

Figure 17:
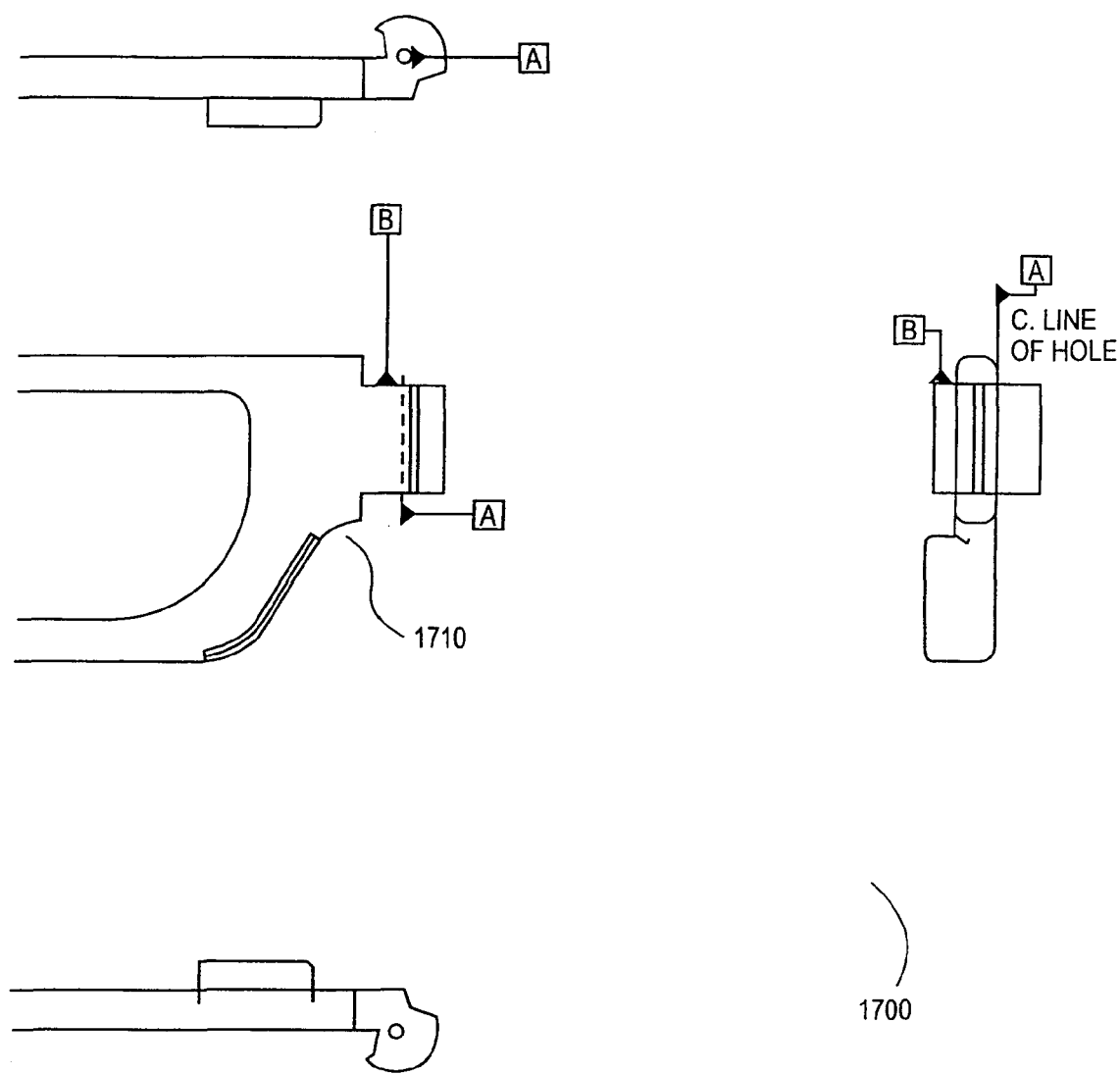
FIG. 17 illustrates a detail view of a left (second) temple fitting into a left (second) eye piece.

FIG. 17 illustrates a detail view of a left (second) temple 1700 fitting into a left (second) eye piece via a spring loaded plunger.

Figure 18:
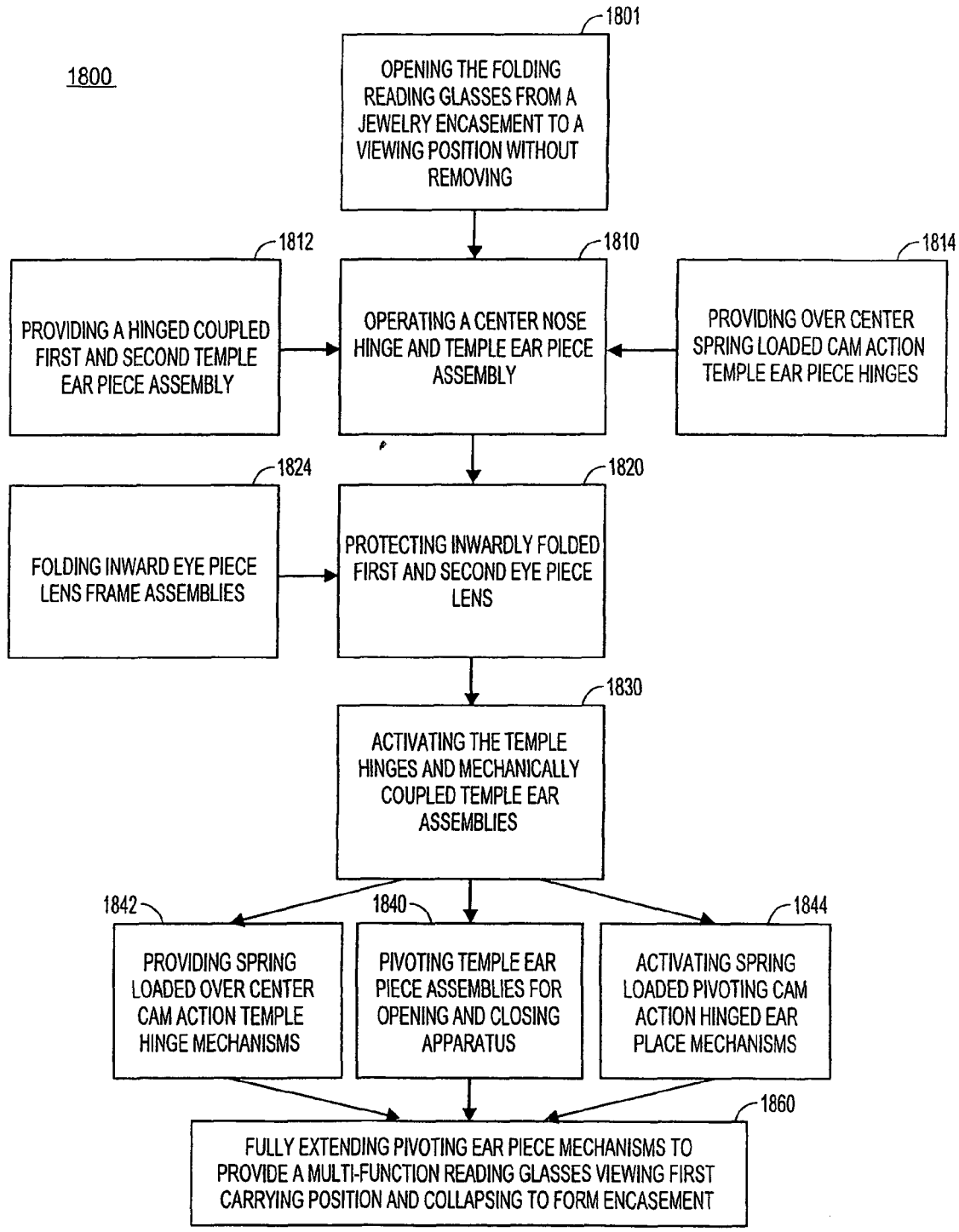
FIG. 18 illustrates a method and process for providing multi-function reading glasses.

FIG. 18 illustrates a block diagram of a method 1800 for folding reading glasses into a jewelry-like ornamental encasement without removing the folding reading glasses from a first carrying position. The method also illustrates opening the folding reading glasses from a jewelry-like ornamental encasement configuration to a first carrying configuration 1801. The overall method 1800 includes an activation step 1810. In step 1810, a nose hinge coupled to a first and second temple and ear piece assembly is activated. In step 1820, the first and second eye piece lenses are folded inwardly. In step 1830, a first and second temple hinge is activated in response to a completely inwardly folded lens to lens frame assembly. Next, in step 1840 the first and second temple hinges 1842 are pivoted via a spring loaded over center cam action mechanism. Step 1840 shows activating a first and second ear piece hinge and pivot mechanism 1844 is activated to invert the first and second ear piece into a lens to lens frame assembly encasement wherein the exterior of the lens to lens frame assembly encasement appears as a piece of jewelry and the fully extended configuration forms a viewing first carrying position 1860.

Figure 19:
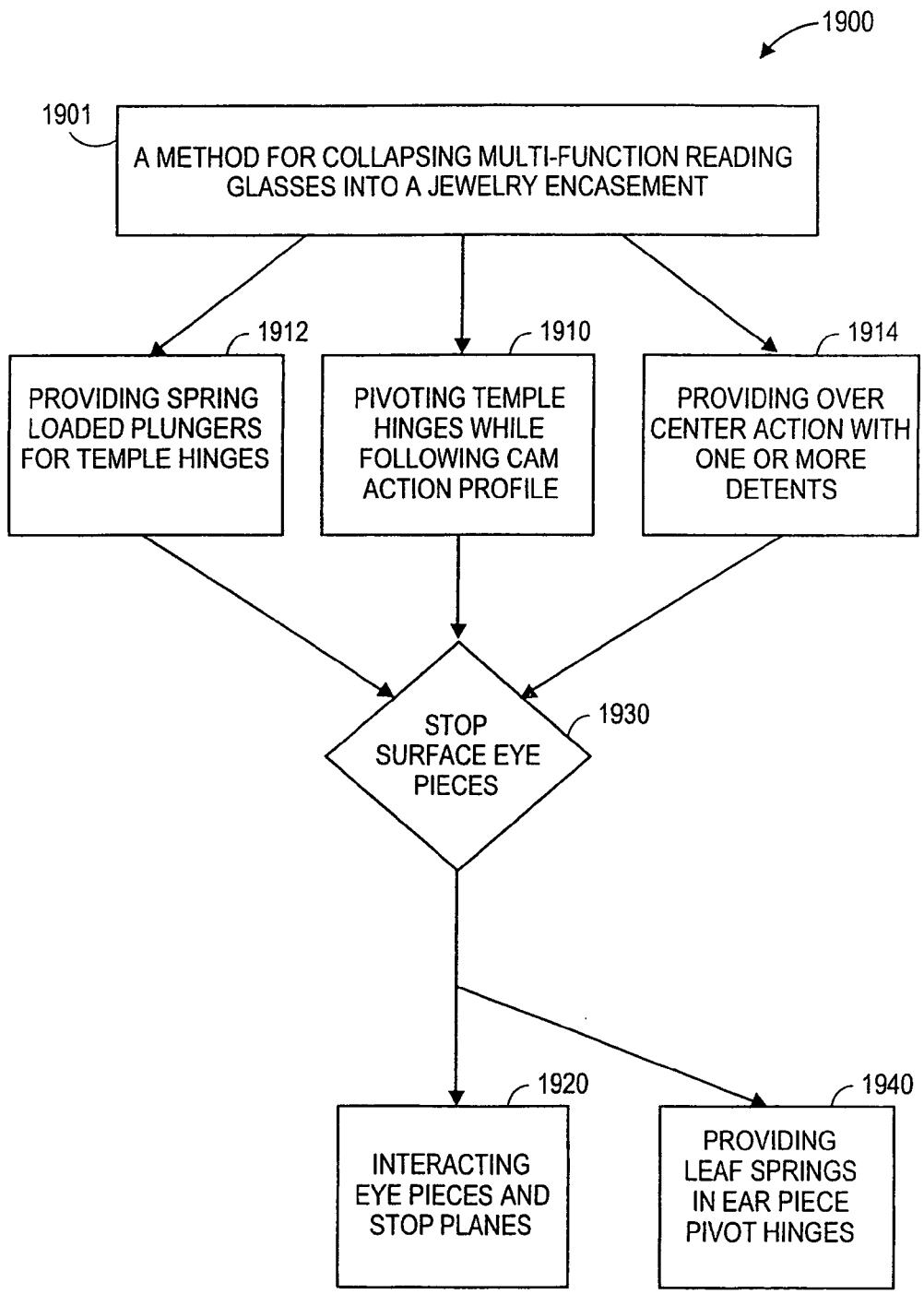
FIG. 19 illustrates a method for collapsing multi-function reading glasses into a jewelry encasement.

FIG. 19 illustrates a flow diagram of a method for folding and collapsing reading glasses into a jewelry encasement 1901 further comprising additional steps 1910-1940. The overall diagram 1900 includes the sequence of steps. In step 1910, a method is provided for pivoting said first and second temple hinges via a spring loaded over center cam action mechanism that includes spring loaded plungers that follow the cam profile. Step 1912 illustrates providing a spring loaded plunger facilitates the quick release, rapid access function of the temple hinges. In step 1914, providing the over center spring loaded hinge, coupled with one or more detents interacts with cams to provide a snap open and closed quick release nose hinge feature. Step 1920 provides interacting between the eye pieces and stop planes interact to provide protection for the lenses in the inwardly folded configuration. Step 1930 provides a stop plane on the first and second temple piece is shown. Finally, step 1940 illustrates providing a leaf spring to activate the first and second ear piece hinge and pivot mechanisms is shown.

Figure 20:
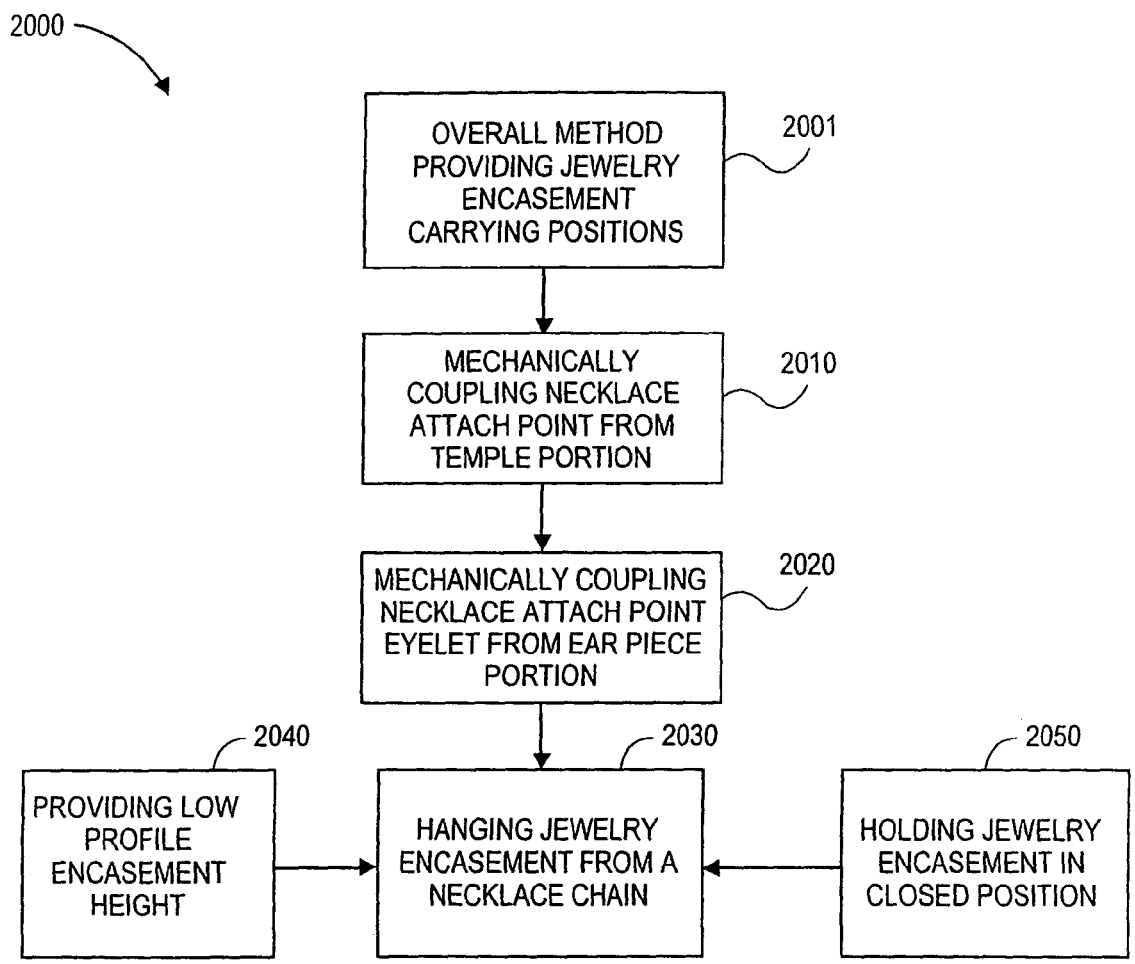
FIG. 20 illustrates a method for providing a jewelry encasement carrying position.

FIG. 20 illustrates a method for folding reading glasses into a jewelry encasement by mechanically coupling a necklace chain and necklace attach point. The overall process 2000 shows steps 2010-2050 to provide various aspects of the encasement as worn in its fully retracted, closed position. In step 2010, mechanically coupling a necklace attach point eyelet from the jewelry encasement temple portion is shown. Step 2020 illustrates mechanically coupling a necklace attach point eyelet from the jewelry encase ear piece portion. Step 2030 shows hanging the jewelry encasement from a necklace chain. Step 2040 illustrates a method for providing a low profile encasement height from the jewelry encasement. Finally, step 2050 shows holding the jewelry encasement in the closed position.

Figure 21:
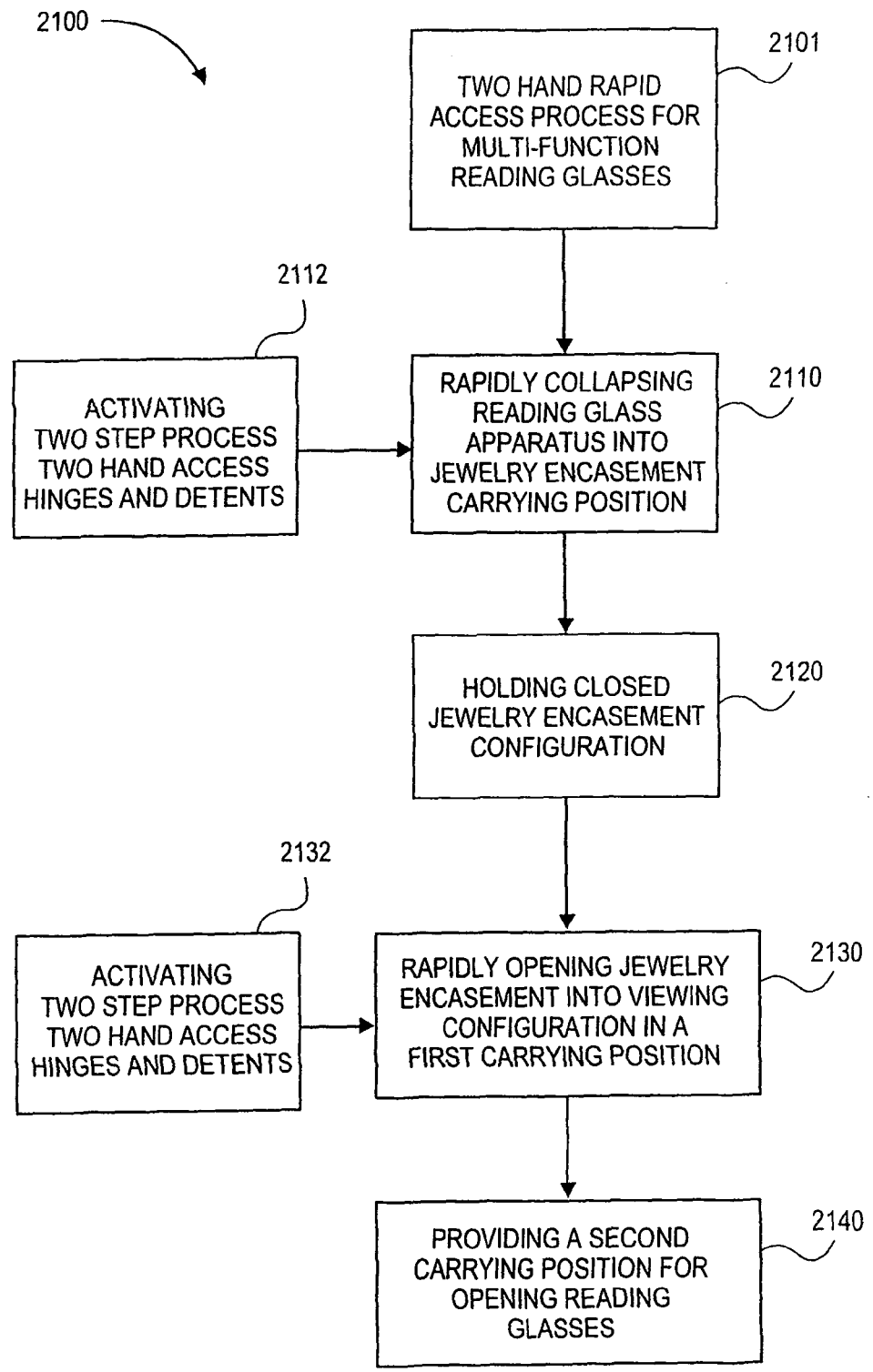
FIG. 21 illustrates a two hand rapid access process for multi-function reading glasses.

FIG. 21 illustrates a method for folding reading glasses into a jewelry encasement, further comprising steps 2110-2140. The overall method 2100 shows the rapid access quick release steps to utilize a two hand operation to open the glasses to a fully extended optical viewing configuration. In step 2110, rapidly accessing the jewelry encasement from an open position of multi-function folding reading glasses wherein the jewelry encasement represents the fully closed position of the multi-function reading glasses. Step 2101 illustrates facilitating the rapid access operation utilizing a two hand operation wherein the nose hinge, first and second temple hinges, and first and second ear piece hinge pivot assemblies activate in a two step motion 2112, 2132. In step 2120, holding closed the jewelry encasement configuration is shown. Step 2130 illustrates rapidly opening the jewelry encasement into a viewing configuration in a first carrying position. Step 2140 also illustrates providing a second carrying position for opening reading glasses.

Figure 22:
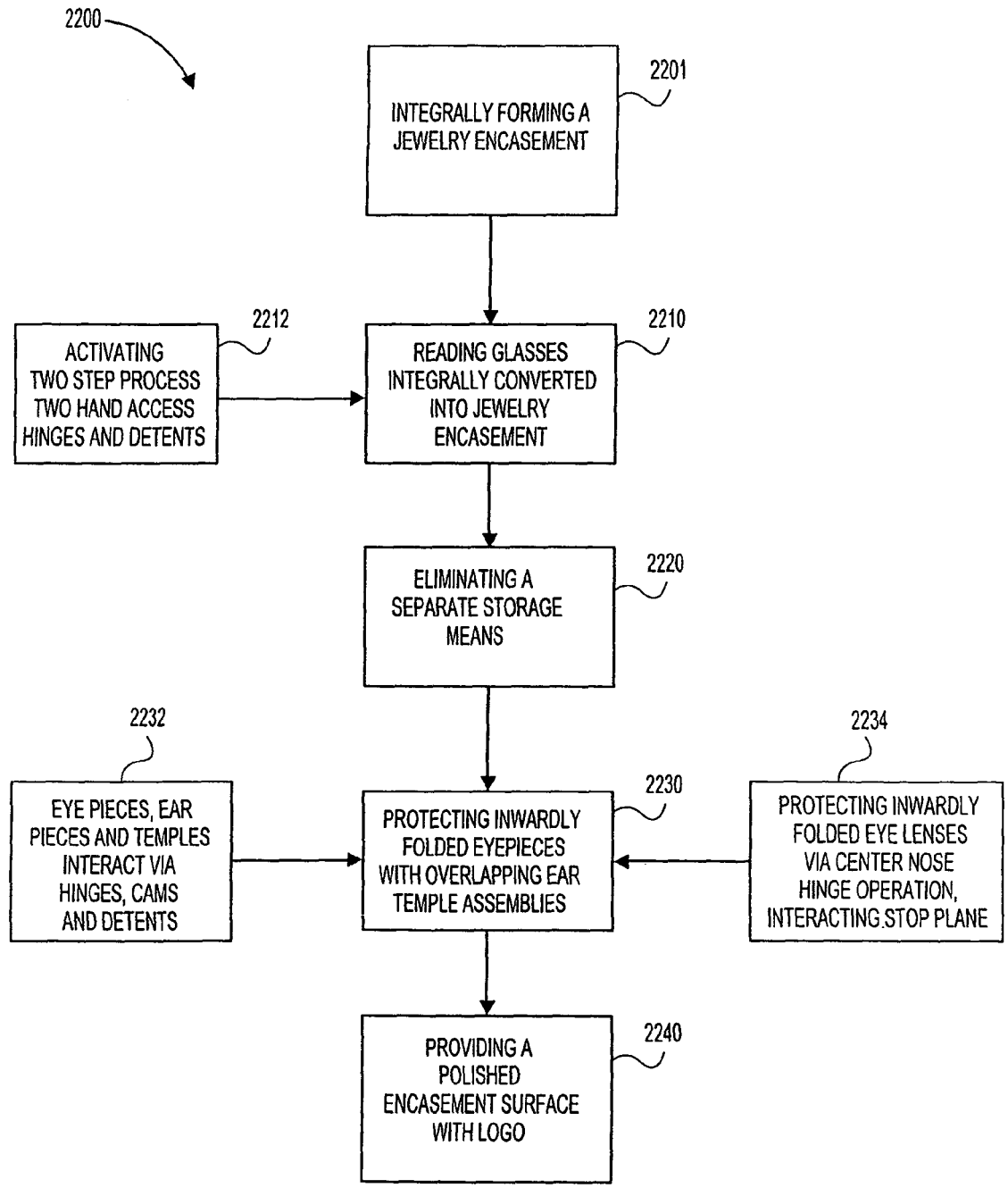
FIG. 22 shows integrally forming a jewelry encasement to protect inwardly folded eyepieces.

FIG. 22 further illustrates integrally forming the jewelry encasement thereby eliminating the need for a separate storage means 2220. The jewelry encasement is integrally formed 2201 by activating a two step process of hinges, cams and detents interacting 2212, 2232. The jewelry encasement 2210 comprises a first and second ear piece in its folded position, a first and second temple in its folded position, and a first and second eye piece in its inwardly folded position to integrally convert reading glasses into a jewelry encasement 2210 and to fully open the encasement into multi-function reading glasses in a first carrying position. The first and second ear pieces, first and second eye pieces, and first and second temples interact through the activation of spring loaded, cam action over center hinges 2212, 2232 such that the spring hinges snap into a first and second detent position utilizing a cam radius set inside of an overlapping lip in which an interacting edge is seated. Step 2230 illustrates protecting inwardly folding eyepieces with overlapping ear temple assemblies. Step 2234 illustrates protecting inwardly folded eye lenses via a center nose hinge operation interacting with the stop plane. Step 2240 further illustrates providing a polished encasement surface with a logo.

Figure 23:
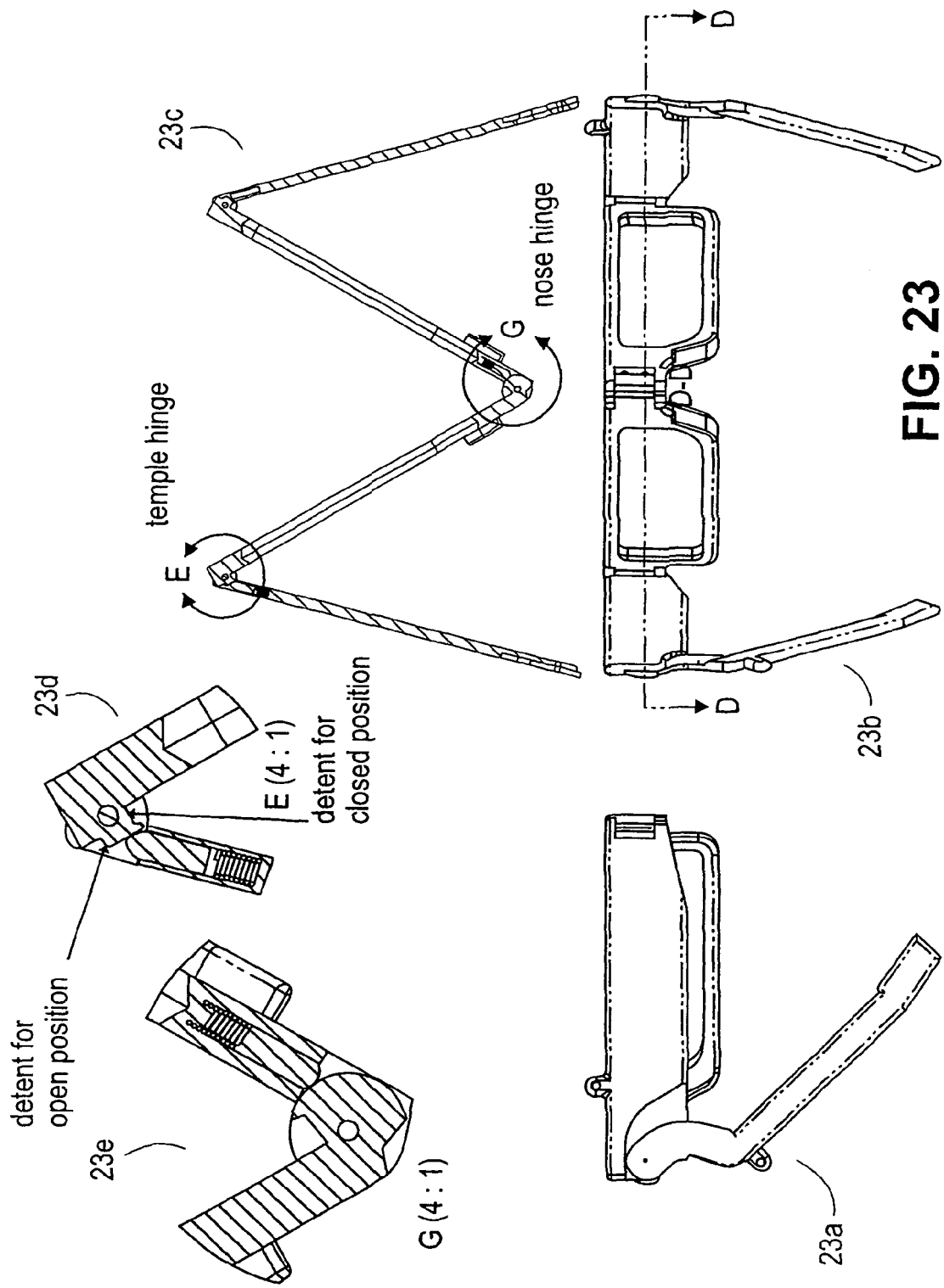
FIG. 23a-23e illustrates detail views of various aspects of the multi-function folding reading glasses apparatus and jewelry encasement configuration.

FIG. 23 further illustrates various aspects of the multi-function folding reading glasses apparatus and jewelry encasement configuration. FIG. 23a illustrates the pivoting ear piece in a partially retracted position such that the protected eyepieces are shown underneath to illustrate the protection provided in the fully collapsed encasement configuration. FIG. 23b illustrates a front view of the multi-function glasses in an intermediate position of a viewing configuration wherein the two hand operation is partially implemented such that the ear pieces are pivoting about an axis D from a point located at the distal end from the temples. FIG. 23c illustrates the same intermediate position of a viewing configuration from a top view such that the temple hinges pivot about a point E and the nose hinge pivots about a point G. FIG. 23d shows a detail view of a detent for the open position and a detail view of a detent for the closed position wherein the detail view shows the cam travel in an intermediate position between the open and closed positions. A spring loaded, snap action, outward folding hinge spring that mechanically couples a first and second temple piece to a first and second eyepiece is also shown. Finally, FIG. 23e shows a detail view of the hinge pivot point G wherein the over center quick release spring loaded nose hinge provides rapid access to the open and closed positions to form multi-function reading glasses or a jewelry encasement configuration.

Figure 24:
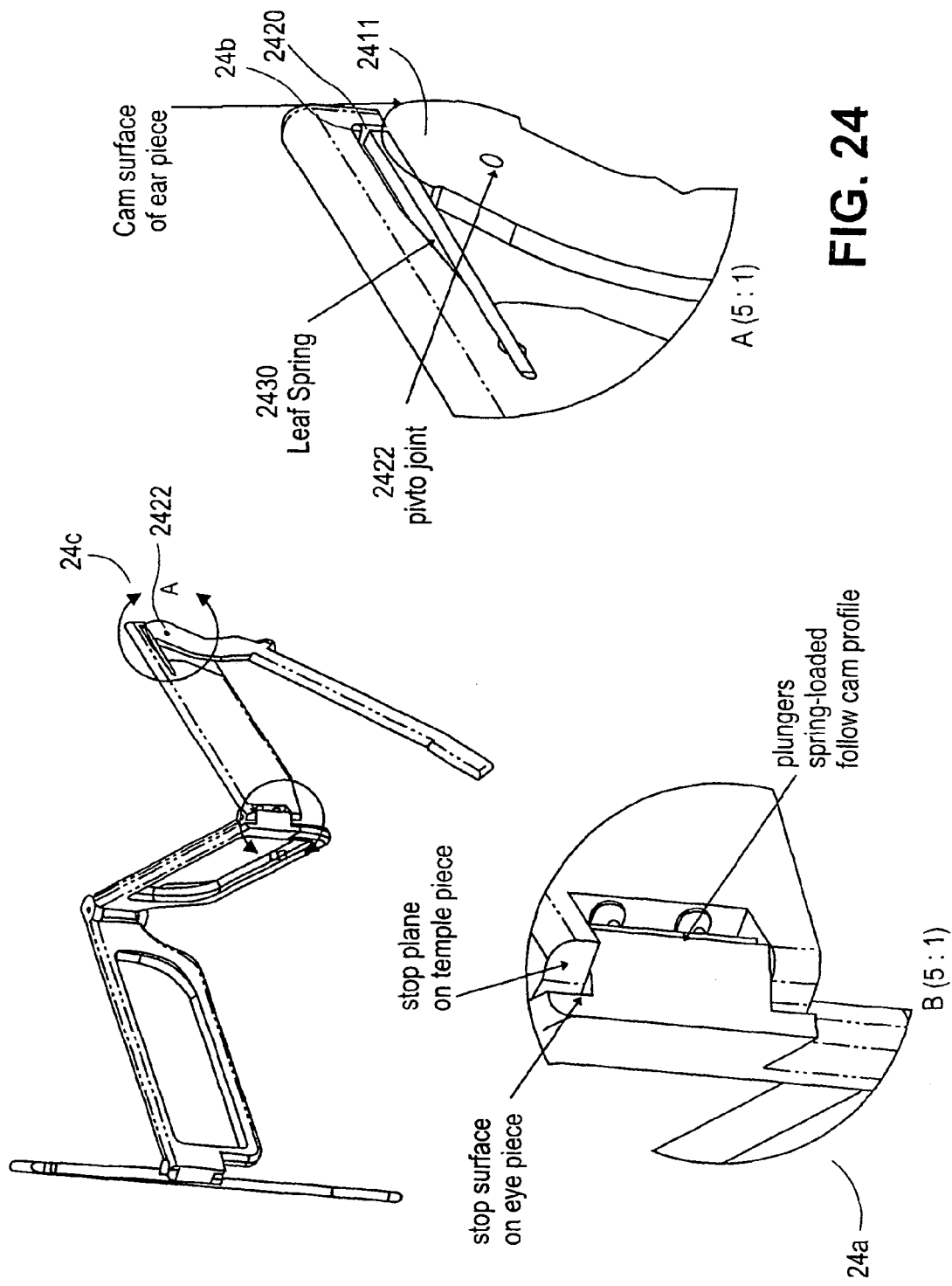
FIG. 24a-24c illustrates detail views of various aspects of the multi-function folding reading glasses apparatus configuration.

FIG. 24 further illustrates various aspects of the multi-function folding reading glasses apparatus and jewelry encasement configuration. FIG. 24a illustrates a detail view of the spring loaded plunger follow cam profile interacting with the stop plane on the temple piece portion and stop plane on the eyepiece. The detail view further illustrates how the interaction results in a quick release snap action fit wherein the spring loaded plunger operates parallel to an axis B. FIG. 24b illustrates a pocket 2420 to receive the ear piece cam surface 2411 and leaf spring 2430. The leaf spring 2430 is a spring loaded, snap action, pivot hinge. The ear piece cam surface 2411 pivots about a pivot joint location 2422 to provide quick release cam action leaf spring opening and closing of the ear pieces to open and collapse the multi-function reading glasses apparatus and jewelry encasement. FIG. 24c further illustrates a path of the ear piece pivot motion about a pivot joint location 2422 in a pivot plane A. Also, FIG. 24c illustrates a path of the temple piece picot motion about a pivot axis in a pivot plane B wherein pivot plane A and pivot plane B are substantially perpendicular.

Figure 25:
FIG. 25 illustrates the multi-function, folding reading glasses as worn by a user.

FIG. 25 further illustrates the multi-function folding reading glasses apparatus 2501 and the necklace attach point 2522. A user may wear the glasses with a necklace 2510 to quickly convert the apparatus from a fully extended configuration as shown in FIG. 25 to an encasement configuration (not shown).

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A multi-function folding reading glasses encasement apparatus comprising:
   a first frame eyepiece mechanically coupled to a first temple piece, said first frame eyepiece having a first frame surrounding a substantially rectangular-shaped lens said first frame eyepiece mechanically coupled to the first temple piece by a spring loaded, snap action, outward folding hinge;
   a second frame eyepiece mechanically coupled to a second temple piece, said second frame eyepiece having a second frame surrounding a second substantially rectangular-shaped eye lens;
   a spring-loaded, snap-action nose hinge mechanism that couples the first frame eyepiece to the second frame eye piece;
   a first ear piece mechanically coupled to the first temple by a first upward spring loaded, snap action, pivot hinge and a first earpiece detent including a spring loaded first cam location;
   a second ear piece mechanically coupled to the second temple-piece by a second upward spring loaded, snap action, pivot hinge and a second earpiece detent including a spring loaded second cam location wherein an eyeglass encasement is formed via an inward fold of the spring loaded, snap action, hinged nose mechanism and the mechanically coupled first and second eyepieces, first and second temple pieces, and first and second earpieces;

a stop surface mechanism on said first frame eyepiece and said second frame eyepiece;

a stop plane mechanism on said first temple piece and said second temple piece;

a leaf spring wherein the leaf spring energy allows the first and second ear piece to operate with quick release action when the pivot advances over center of a starting configuration; and one or more spring actuated quick release mechanisms having a fully extended open position and a fully retracted closed position.

2. The apparatus of claim 1, further comprising:

an eyeglass encasement forming an ornamental, jewelry appearance in its fully enclosed configuration, a necklace attach point to hang the encasement therefrom via a mechanically coupled necklace loop wherein the encasement fully encloses the eyeglass lenses, a first and second lockable cam action, spring loaded hinge, an intermediate configuration of the apparatus having a first and second unfolded position, and a first and second temple ear piece assembly wherein said assembly is shaped, once folded, substantially the same as the eyepieces with substantially no overlapping view of said eyepieces.

3. The apparatus of claim 2, further comprising:

an ornamental encasement having a first carrying position for folded reading glasses such that said position for folded reading glasses is attained without removing said folded reading glasses from said mechanically coupled necklace loop or said first carrying position.

4. The apparatus of claim 2, wherein a first and second lockable cam action, spring loaded hinge, in combination, facilitates a quick release, two hand unfolding operation to receive the first and second eyepiece in a user optical viewing position from a position for the folded reading glasses encasement.

5. The apparatus of claim 4, wherein the spring loaded, snap action, hinged center nose mechanism is coupled to the first and second eye pieces and provides an open and closed position that includes a spring biased resistance and a cam action detent such that the force to overcome said open and closed position requires a two hand motion to operate.

6. The apparatus of claim 5, wherein the hinged, midpoint joining the first and second eye pieces provides an open and closed position that further provides a quick release, rapid access optical viewing configuration such that said viewing configuration may be hung from a necklace loop in a first carrying position for the unfolded reading glasses.

7. The apparatus of claim 2, wherein the extended first and second ear pieces pivot about a point located substantially equidistant from a proximal end and a distal end of the extended first and second ear pieces such that the inwardly pivoting folding operation of said first and second ear pieces join the proximal end of said first and second ear pieces at hinged point joining the first and second eye pieces.

8. The apparatus of claim 7, further comprising:

a closed configuration of the spring loaded, snap action, hinged center nose mechanism wherein the force to utilize the two hand motion is less than the force to overcome said spring bias resistance and cam action detent, and the spring biased resistance and cam action detent of the spring loaded, snap action, hinged center nose mechanism wherein the force to overcome said open and closed position changes the apparatus from said open position to said closed position or from said closed position to said open position thereby unlocking said spring loaded, snap action, hinged center nose mechanism from a locked previous position.

9. The apparatus of claim 2, further comprising:

the first and second eye pieces are of substantially the same shape when viewed from the front as the first and second temples and first and second ear pieces first inwardly folded together wherein said first inwardly folded configuration provides a collapsed first and second ear piece and temple assembly, said first and second ear piece and temple assembly pivoting inwardly about a first and second hinged point joining the first and second eye pieces with the first and second ear piece and temple assemblies such that the shape of the first and second ear piece and temple assemblies substantially covers the first and second eye pieces when the multi-function folding reading glasses are in the completely inwardly folded position to provide an encasement for said first and second eye pieces.

10. The apparatus of claim 9, wherein the extended position of the overall apparatus assembly is rapidly folded inwardly to a fully folded position such that the inwardly folded multi-function folding reading glasses integrally form an encasement that creates an exterior jewelry appearance.

11. The apparatus of claim 1 wherein the second temple includes a necklace attach point mechanically coupled about a spring loaded, snap action, pivoting intersection point to a second ear piece and the first temple mechanically coupled about a spring loaded, snap action, pivoting intersection point to a first ear piece, said first and second ear pieces pivoting outwardly to form an extended position of the overall apparatus assembly mechanically coupled to said necklace attach point via a necklace loop to provide a first carrying position for unfolded reading glasses such that said first carrying position for unfolded reading glasses is attained without removing said unfolded reading glasses from said mechanically coupled necklace loop or said first carrying position.

12. The apparatus of claim 11, wherein the extended position of the overall apparatus assembly to provide unfolded reading glasses provides a necklace attach point on the second temple such that a necklace chain allows the multi-function folding reading glasses to rest in an open position while not positioned in an optical viewing configuration.

13. The apparatus of claim 11, further comprising:

a spring actuated quick snap mechanism having an open position wherein the hinged nose mechanism mechanically coupled to a first frame eyepiece via a first temple, said first frame eyepiece attached to a first eye lens and mechanically coupled to a first temple utilizing an outward folding hinge, rapidly unfolds into a fully extended position such that a one hand operation facilitates the unfolding via outwardly folding first and second ear piece and eye piece assemblies that overcome a first spring biased resistance and a first cam action detent.

14. The apparatus of claim 13, further comprising:

the spring actuated quick snap closed position wherein the hinged nose mechanism mechanically coupled to a first frame eyepiece via a first temple, said first frame eyepiece attached to a first eye lens and mechanically coupled to a first temple utilizing an inward folding hinge, rapidly folds into a fully collapsed position such that a two hand operation facilitates the inward folding via inwardly folding first and second ear piece and eye piece assemblies that overcome a second spring biased resistance and a second cam action detent.

15. The method of claim 14, further comprising:

rapidly accessing the jewelry encasement from an open position of multi-function folding reading glasses wherein the jewelry encasement represents the fully closed position of the multi-function reading glasses; and facilitating said rapid access via a two hand operation wherin the nose hinge, first and second temple hinges, and first and second ear piece hinge pivot assemblies activate in a two step motion.

16. The apparatus of claim 13, further comprising:

the spring actuated quick release fully retracted closed position wherein said fully retracted closed position is configured in an encasement wherein the first and second eye lens are protected from damage in a plurality of athletic activities; and the integrally formed eyeglass encasement may be worn as a piece of jewelry wherein said front facing surface is a shined finish and is etched with a decorative logo.

17. The method of claim 16, further comprising:

rapidly accessing the jewelry encasement from an open position of multi-function folding reading glasses wherein the jewelry encasement represents the fully closed position of the multi-function reading glasses; and facilitating said rapid access via a two hand operation wherein the nose hinge, first and second temple hinges, and first and second ear piece hinge pivot assemblies activate in one or more motions wherein said two hand operation, two step motion includes a first unfolding step to achieve an intermediate unfolded reading glass configuration and a second unfolding step to achieve a fully extended unfolded reading glass configuration such that said fully extended unfolded reading glass configuration provides a first carrying position for unfolded reading glasses such that said position for unfolded reading glasses and a quick release, rapid access optical viewing position such that said unfolded reading glasses may be hung from a necklace loop in a first carrying position for the unfolded reading glasses.

18. A method for folding reading classes into a jewelery-like encasement comprising the following steps: activating a nose hinge coupled to a first and second temple and ear piece assembly; folding inward a first and second eye piece frame assembly wherein said first and second eye piece lenses are facing each other but separated by a distance equal to the radius of the activated nose hinge such that the first and second eye piece lenses are protected from damage during extreme use; activating a first and second temple hinge in response to a completely inwardly folded lens to lens frame assembly, wherein said first and second temple hinges are shaped, once folded, substantially the same as the eyepieces with substantially no overlapping view of said eyepieces; pivoting said first and second temple hinges via a spring loaded over center cam action mechanism: and activating a first and second ear piece hinge and pivot mechanism to invert said first and second ear piece into a lens to lens frame assembly encasement so as to encase and protect the first and second eyepiece lenses; pivoting said first and temple hinges via a spring loaded over center cam action mechanism that include spring loaded plungers that follow the cam profile; stopping the eye piece pivot motion by providing a stop surface mechanism on the eye piece to protect the first and a second eye pieces from damage; stopping the first and second temple piece motion by providing a stop plane mechanism on the first and second temple piece; activating the first and second ear piece hinge and pivot mechanisms providing a leaf spring wherein the leaf spring energy allows the first and second ear piece to operate with quick release action when the pivot advances over center of the starting configuration.

19. The method of claim 18, further comprising:

integrally forming the jewelry encasement thereby eliminating the need for a separate storage means wherein the jewelry encasement comprises a first and second ear piece in its folded position, a first and second temple in its folded position, and a first and second eye piece in its inwardly folded position such that the first and second ear pieces, first and second eye pieces, and first and second temples interact through the activation of spring loaded, cam action over center hinges such that the spring hinges snap into a first and second detent position utilizing a cam radius set inside of a overlapping lip in which an interacting edge is seated.

* * * * *